United States Patent
Savell et al.

(10) Patent No.: US 7,219,194 B2
(45) Date of Patent: May 15, 2007

(54) METHOD AND CIRCUIT TO IMPLEMENT DIGITAL DELAY LINES

(75) Inventors: Thomas C. Savell, Santa Cruz, CA (US); Carl K. Wakeland, Scotts Valley, CA (US)

(73) Assignee: Creative Technology Ltd, Singapore (SG)

( * ) Notice: Subject to any disclaimer, the term of this patent is extended or adjusted under 35 U.S.C. 154(b) by 333 days.

(21) Appl. No.: 10/875,338

(22) Filed: Jun. 23, 2004

(65) Prior Publication Data

US 2005/0289298 A1    Dec. 29, 2005

(51) Int. Cl.
G06F 12/00    (2006.01)
(52) U.S. Cl. ...................................... 711/118
(58) Field of Classification Search ................ 711/118, 711/137, 167; 84/604, 605
See application file for complete search history.

(56) References Cited

U.S. PATENT DOCUMENTS

| | | |
|---|---|---|
| 5,342,990 A | 8/1994 | Rossum |
| 5,928,342 A | 7/1999 | Rossum |
| 6,032,235 A | 2/2000 | Hoge |
| 6,275,899 B1 | 8/2001 | Savell et al. |
| 7,107,401 B1 * | 9/2006 | Savell et al. ................. 711/118 |

FOREIGN PATENT DOCUMENTS

WO    WO-09901953 A1    1/1999

OTHER PUBLICATIONS

Handy, "The Cache Memory Book", 1993, pp. 87-91.*
"U.S. Appl. No. 10/636,087", Uploaded by jdent Nov. 17, 2005, filed Aug. 6, 2003, 48 pages (application only).

* cited by examiner

*Primary Examiner*—Kevin L. Ellis
(74) *Attorney, Agent, or Firm*—Schwegman, Lundberg, Woessner & Kluth, P.A.

(57) ABSTRACT

A delay line circuit and method to delay digital data in a main memory is provided. The delay line circuit may comprise primary delay line cache, secondary delay line cache, and a cache controller to control communication of data between the secondary delay cache and the primary delay cache. The primary delay line cache may receive digital data to be delayed from a signal processor module, and secondary delay line cache may be connected to the primary delay line cache and the main memory to send data to and receive delayed data from the main memory. Data in the secondary delay line cache may be updated with data from the main memory or with data from the primary delay line cache. The invention extends to a machine-readable medium comprising a set of instructions for executing any of the methods described herein.

36 Claims, 20 Drawing Sheets

METHOD AND CIRCUIT TO IMPLEMENT DIGITAL DELAY LINES

FIELD OF THE INVENTION

The present invention relates generally to the field of digital signal processing and, more specifically, to method and apparatus to process digital signals, for example, to implement digital delay lines in external memory.

BACKGROUND OF THE INVENTION

Delay lines are commonly used in the electronics art to provide predetermined amounts of delay for signals. The delay facilitates the implementation of many functions and features. For example, in the field of audio signal processing, digital audio delay lines are used to provide echo effects, reverberation effects, distortion effects, three-dimensional (3-D) audio, and environmental modeling.

A digital delay line is conventionally implemented with a block of memory that is accessed using two pointers, a read pointer and a write pointer. The memory block contains data samples. The read and write pointers point to the locations in the delay line containing the current read and write samples, respectively. As a data sample is written to the current location in the delay line, the write pointer is advanced to the next location. Similarly, as a data sample is retrieved from the delay line, the read pointer is advanced to the next data sample. The difference between the read and write pointers represents the signal delay, in sample periods. By adjusting the location of either the read or the write pointer, or both, different amounts of delay can be obtained.

Many digital signal processor (DSP) algorithms that use digital delay lines require access to the delay lines with minimal latency (or low or near-zero access delay). Typically, a relatively large number of delay lines are needed to support these algorithms. Further, a read and a write access are typically performed for each delay line and for each sample period.

SUMMARY OF THE INVENTION

A method and apparatus to process digital delays is provided. The invention extends to a machine-readable medium embodying a sequence of instructions that, when executed by a machine, cause the machine to carry out any one or more of the methods described herein.

Other features of the present invention will be apparent from the accompanying drawings and from the detailed description that follows.

BRIEF DESCRIPTION OF THE DRAWINGS

The invention is illustrated by way of example, and not limitation, in the figures of the accompanying drawings, in which like references indicate similar elements unless otherwise indicated.

In the drawings.

DETAILED DESCRIPTION

A method, circuit and apparatus to implement digital delay lines are described. In the following description, for purposes of explanation, numerous specific details are set forth in order to provide a thorough understanding of the invention. It will be evident, however, to one skilled in the art that the invention may be practiced without these specific details.

Figure 1:
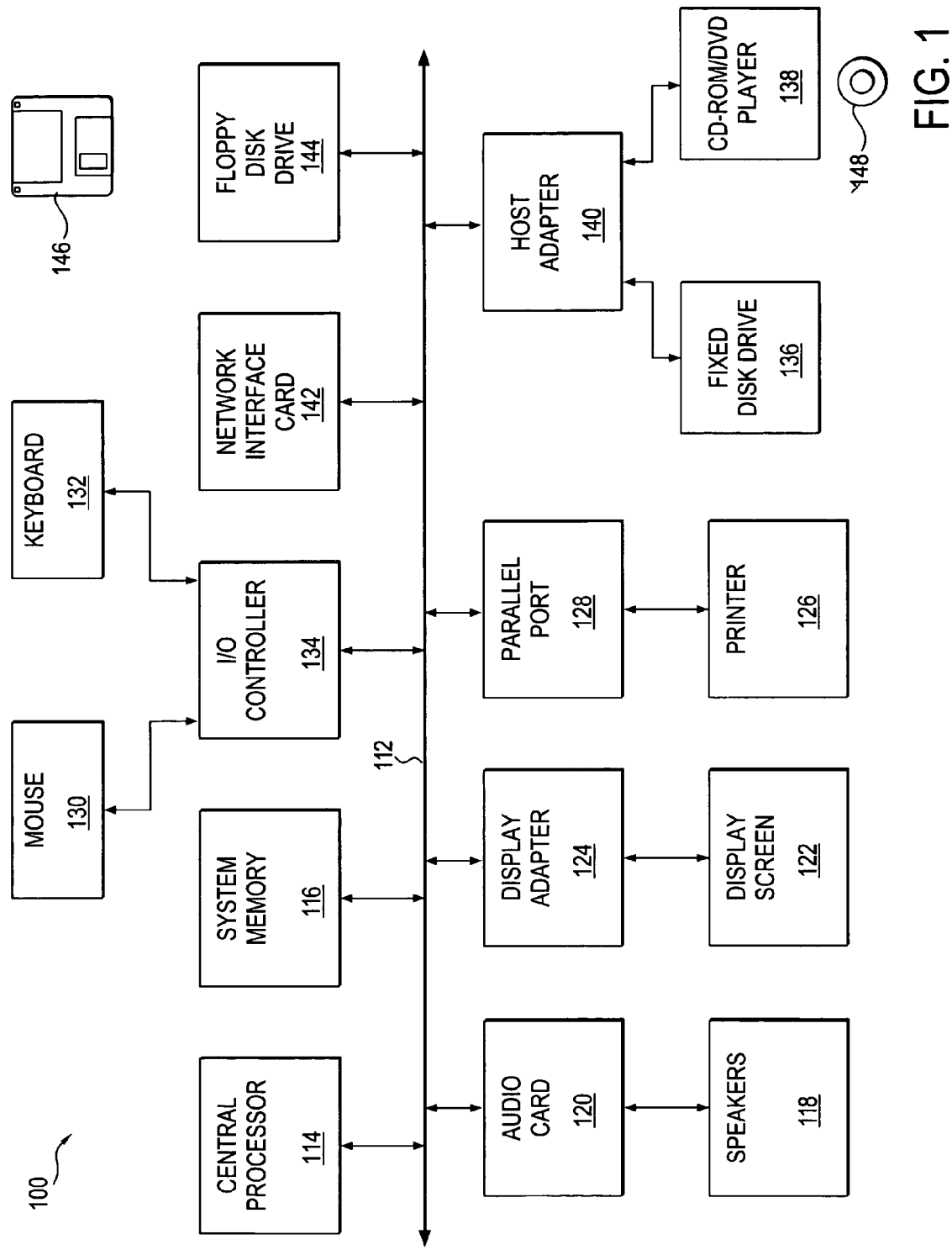
FIG. 1 shows the basic subsystems of a computer system suitable for implementing some embodiments of the invention.

Referring to the drawings, FIG. 1 shows exemplary subsystems of a computer system 100 suitable for implementing some embodiments of the invention. In FIG. 1, the computer system 100 includes a bus 112 that interconnects major subsystems such as a central processor 114, system or main memory 116, and optional external devices such as speakers 118 via an audio card 120, a display screen 122 via a display adapter 124, a printer 126 via a parallel port 128, a mouse 130 and a keyboard 132 via an input/output (I/O) controller 134, a fixed disk drive 136 and a CD-ROM/DVD player 138 via a host adapter 140, a network interface card 142, and a floppy disk drive 144 operative to receive a floppy disk 146.

It will be appreciated that many other devices or subsystems (not shown) can be also be connected, such as a scanning device, a touch screen, and others. Also, it is not necessary for all of the devices or subsystems shown in FIG. 1 to be present to practice the present invention. Furthermore, the devices and subsystems may be interconnected in different configurations than that shown in FIG. 1. The operation of a computer system such as that shown in FIG. 1 is readily known in the art and is not discussed in detail herein. Source code, machine code, or machine-independent code to implement some embodiments of the invention may be operatively disposed in the system memory 116, located in a subsystem that couples to the bus 112 (e.g., the audio card 120), or stored on storage media such as the fixed disk drive 136, the floppy disk 146, or a CD-ROM/DVD 148 that operates with the CD-ROM/DVD player 138.

The bus 112 can be implemented in various manners. For example, the bus 112 can be implemented as a local bus, a serial bus, a parallel port, or an expansion bus (e.g., ADB, SCSI, ISA, EISA, MCA, NuBus, PCI, or other bus architectures). The bus 112 may provide relatively high data transfer capability (e.g., through multiple parallel data lines) but may generally be characterized by a relatively high latency (long access time). Generally, for improved efficiency, in one embodiment the bus 112 may operate in a "vectorized" or "burst" mode characterized by the grouping of many read or write transactions to memory addresses into a single memory "operation" performed on a "vector" of data. The system memory 116 can be a random-access memory (RAM), a dynamic RAM (DRAM), or other memory devices.

Figure 2:
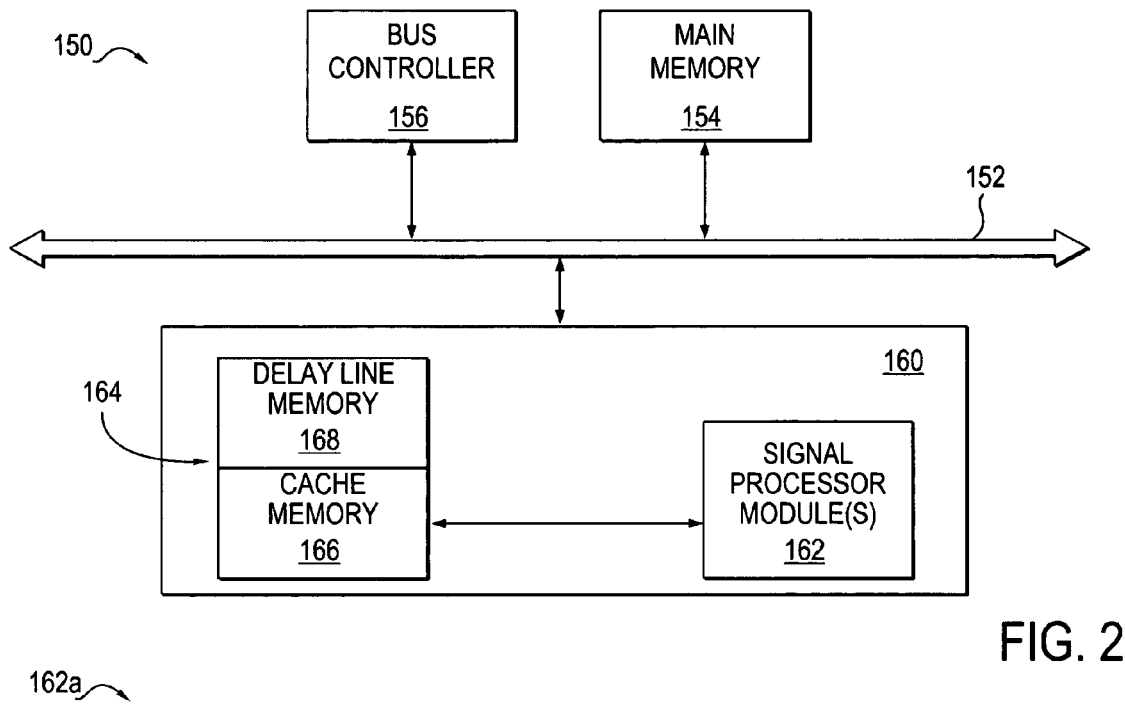
FIG. 2 shows a block diagram of an embodiment of a signal processing system in accordance with one aspect of the invention.

FIG. 2 shows a block diagram of an embodiment of a signal processing system 150 in accordance with one aspect of the invention. The signal processing system 150 can be implemented within the computer system 100 shown in FIG. 1, where a bus 152 and a main or external memory 154 correspond to the bus 112 and the system memory 116, respectively. The signal processing system 150 can also be implemented within a circuit card or board (e.g., an audio card 120 in FIG. 1), where the bus 152, the main memory 154, and a bus controller 156 are elements of the circuit card. The signal processing system 150 can further be implemented, at least in part, within an integrated circuit, such as a microprocessor, a digital signal processor (DSP), a microcomputer, an application specific integrated circuit (ASIC), or the like.

Within the signal processing system 150, the bus 152 interconnects the main memory 154, the bus controller 156, and a signal processing subsystem 160. In one embodiment, the signal processing subsystem 160 is implemented within an integrated circuit including a bus interface (e.g., a PCI interface) to interface the signal processing subsystem 160 to the bus 152. The signal processing subsystem 160 may include one or more signal processor module(s) 162 coupled to subsystem or circuit memory 164. In one embodiment, the circuit memory 164 is local on-chip internal memory forming an integral part of the signal processing subsystem 160 as opposed to the main or external memory 154 which may form part of a host computer system (e.g., the computer system 100). In one embodiment, the circuit or subsystem memory 164 defines a cache memory portion 166 and a delay line memory portion 168. However, it will be appreciated that the subsystem memory 164 need not include delay line memory but may include only cache memory. Likewise, the subsystem memory 164 need not include cache memory but may include only delay line memory.

In one specific embodiment, the signal processing system 150 is an audio processing system for processing digital audio signals. In this exemplary embodiment, a plurality of signal processor modules 162 may be provided. Examples of signal processor modules 162 include, a signal mixer, a sample rate converter, filters, and supporting circuitry for a CD input, a line input, a MIC input, and a speaker output. An exemplary embodiment of such a system including a plurality of signal processing modules or circuits is described below with reference to FIG. 6.

The cache memory portion 166 provides a buffer between the main memory 154 and the signal processor module 162. The main memory 154 may store the data samples to be operated on or processed by the signal processor module 162. However, since the bus 152 in one embodiment may typically operate in a burst mode and have a high latency, the data samples may be transferred, one block at a time, between the main memory 154 and the cache memory portion 166. The data samples in the cache memory portion 166 may then be more conveniently accessed by the signal processor module 162. The cache memory portion 166 may be implemented, by a person skilled in the art, with sufficient size to provide the required functionality. As described in more detail below, according to one aspect of the invention, the cache memory portion 166 may include a primary delay line cache and a secondary delay line cache. It will be appreciated that the cache memory 166 may be defined by one or more memory circuits on one or more integrated circuits or chips.

Audio systems for processing digital signals are well known in the art. An example of caching at a circuit level is described in U.S. Pat. No. 5,342,990 entitled "DIGITAL SAMPLING INSTRUMENT EMPLOYING CACHE MEMORY," assigned to the assignee of the present invention, and incorporated herein by reference.

Figure 3:
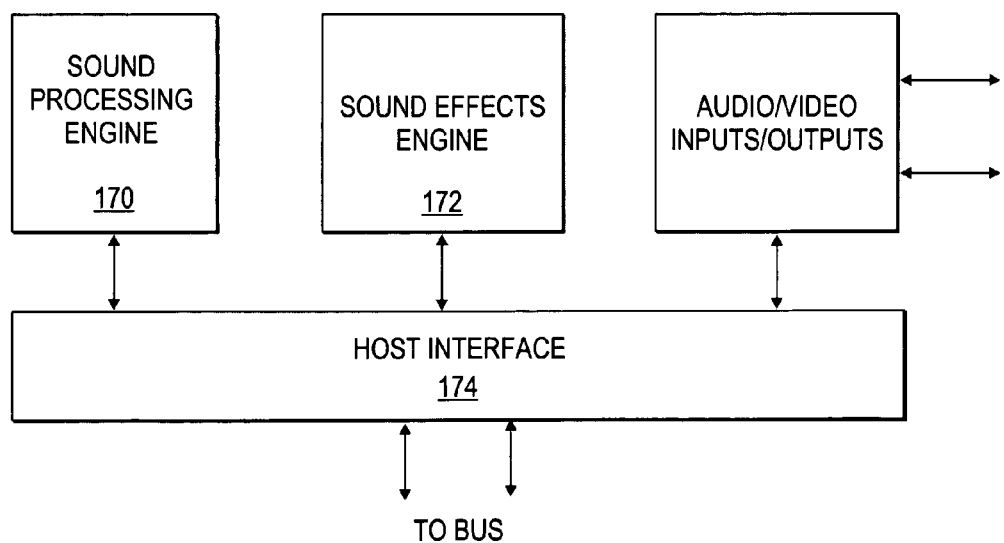
FIG. 3 shows a simplified block diagram of a signal processor used for audio signal processing.

FIG. 3 shows a simplified block diagram of an exemplary signal processor module 162a used for audio processing. The signal processor module 162a may, for example, implement the signal processor module 162 in FIG. 2. The signal processor module 162a may include three primary functional units: a sound processing engine 170, a sound effects engine 172, and a host interface unit 174. The sound processing engine 170 can include, for example, a 64-voice wavetable synthesizer and 16 summing effects buses. Each of the 64 voice channels can be routed, at its respective programmable amplitude, to an arbitrary selection of four of these buses.

The sound effects engine 172 may receive input from the sound processing engine 170 and from additional audio inputs (not shown) such as CD Audio, I²S, a microphone jack, a stereo input and an auxiliary S/PDIF input, among others. The sound effects engine 172 may include functional units to execute signal processing instructions from a digital signal processor (DSP) program. The host interface unit 174 may interface the sound effects engine 172 with a host processor (e.g., the central processor 114 in FIG. 1) using, for example, a PCI protocol. Although not shown in FIG. 3, the signal processor module 162a can also include a memory element or circuitry for storing, for example, source code that directs the operation of the functional units within the signal processor module 162a. A configuration wherein various signal processing modules of the exemplary processor module 162 are arranged in a ring configuration is described in U.S. patent application Ser. No. 10/636,087 filed Aug. 6, 2003, assigned to the assignee of the present invention, and incorporated herein by reference. Details of another configuration of exemplary functional units of the signal processor module 162 are also set forth in U.S. Pat. No. 5,928,342, entitled "AUDIO EFFECTS PROCESSOR INTEGRATED ON A SINGLE CHIP WITH A MULTI-PORT MEMORY ONTO WHICH MULTIPLE ASYNCHRONOUS DIGITAL SOUND SAMPLES CAN BE CONCURRENTLY LOADED," assigned to the assignee of the present invention, and incorporated herein by reference.

Figure 4:
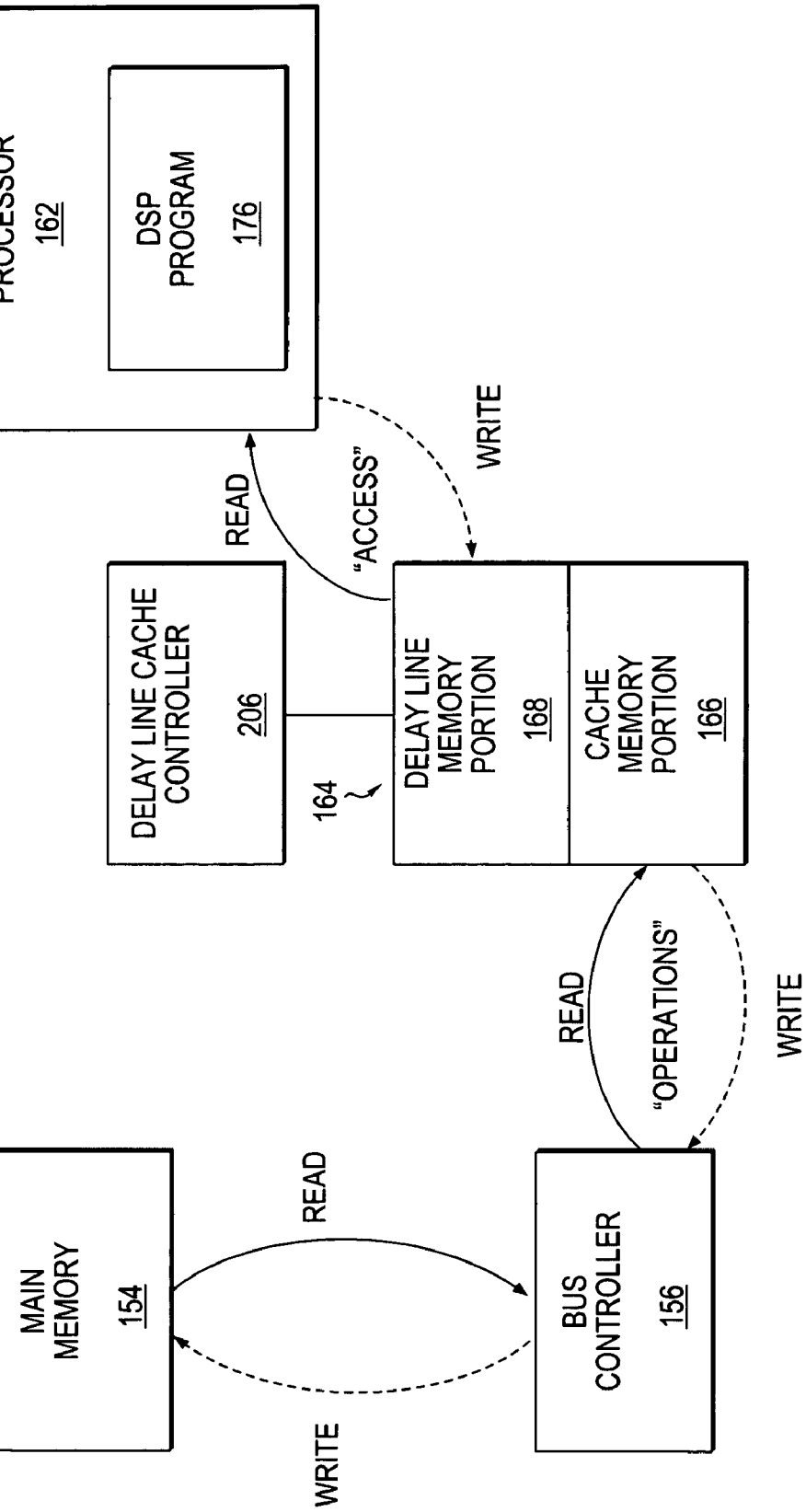
FIG. 4 shows the interaction, in accordance with the invention, between a signal processor, main memory, and cache memory.

FIG. 4 shows exemplary interaction, in accordance with the invention, between the signal processor module 162, the main or external memory 154, and the circuit memory 164. The signal processor module 162 may execute a DSP program 176 that implements algorithms that produce the desired effects. For example, for audio processing, the DSP program 176 may generate echo effects, reverberation effects, distortion effects, 3-D audio, environmental modeling, and others. The DSP program 176 may operate on data samples that reside within the main memory 154. The DSP program 176 may also provide data samples to be stored to the main memory 154. However, in certain embodiments, because of the high latency and burst characteristics of the data transfer to and from the main memory 154, the data samples are temporarily stored in the intermediate cache memory portion 166. For a read access of a data sample by the DSP program 176, the data sample may be retrieved from the cache memory portion 166. Periodically, the contents of the cache memory portion 166 may be replenished by performing a read operation from the main memory 154. Similarly, for a write access of a data sample by the DSP program 176, the data sample may be stored to the cache memory portion 166, and the contents of the cache memory portion 166 may be periodically transferred to the main memory 154 by performing a write operation. For clarity, as used herein, read and write "accesses" include the data transfer between the signal processor module 162 and the circuit memory 164 (including, for example, the cache memory portion 166 and the delay line memory portion 168), and read and write "operations" include the data transfer between the cache memory portion 166 and the main memory 154.

The cache memory portion 166 may thus provide an interface between the main memory 154 and the signal processor module 162. The cache memory portion 166 may bridge the gap between the high-latency, block data transfer characteristics (e.g., of a typical computer system) and the low-latency, single data sample access requirements of the DSP program 176. Further, in one embodiment when implementing digital delay lines, delays in updating the cache memory portion 166 that may render it unsuitable for use by the processor module 162 may be avoided by reading and writing directly to the delay line memory portion 168.

In one embodiment, to efficiently utilize the bus 152 (e.g., with its relatively high latency), the read and write operations may be "vectorized" such that a block of B data samples are read from, or written to the main memory 154 in a single transaction. Data samples required by the signal processor module 162 may be "pre-fetched," a block at a time, from the main memory 154 and temporarily stored in the cache memory portion 166. Similarly, in one embodiment, data samples generated by the signal processor module 162 may be stored to the cache memory portion 166 and subsequently "post-written," a block at a time, to the main memory 154. The cache memory portion 166 may thus provide relatively low-latency access to data samples, on-demand as they are needed by the DSP program 176, and on individual samples.

In some embodiments of the invention, the "pre-fetch" may be possible because the data "usage" is deterministic, and it is possible to know a priori which data samples will be needed in the future. In some other embodiments, the data samples needed in the future can be predicted or estimated. Thus, the data accesses by the processor may be effectively "anticipated." An exemplary method and circuit for implementing some embodiments of the present invention is described in U.S. Pat. No. 6,275,899, entitled "METHOD AND CIRCUIT FOR IMPLEMENTING DIGITAL DELAY LINES USING DELAY CACHES," filed Nov. 13, 1998, and assigned to the assignee of the present invention, and is incorporated herein by reference. The implementation of delay lines as circular buffers is described in U.S. Pat. Ser. No. 08/887,362. A method and circuit that initialize a memory, such as delay lines within main memory 154, and indicate when valid data is available from the memory are described in U.S. Pat. No. 6,032,235, entitled "MEMORY INITIALIZATION CIRCUIT," filed Nov. 14, 1998, and assigned to the assignee of the present invention, and is incorporated herein by reference.

Figure 5:
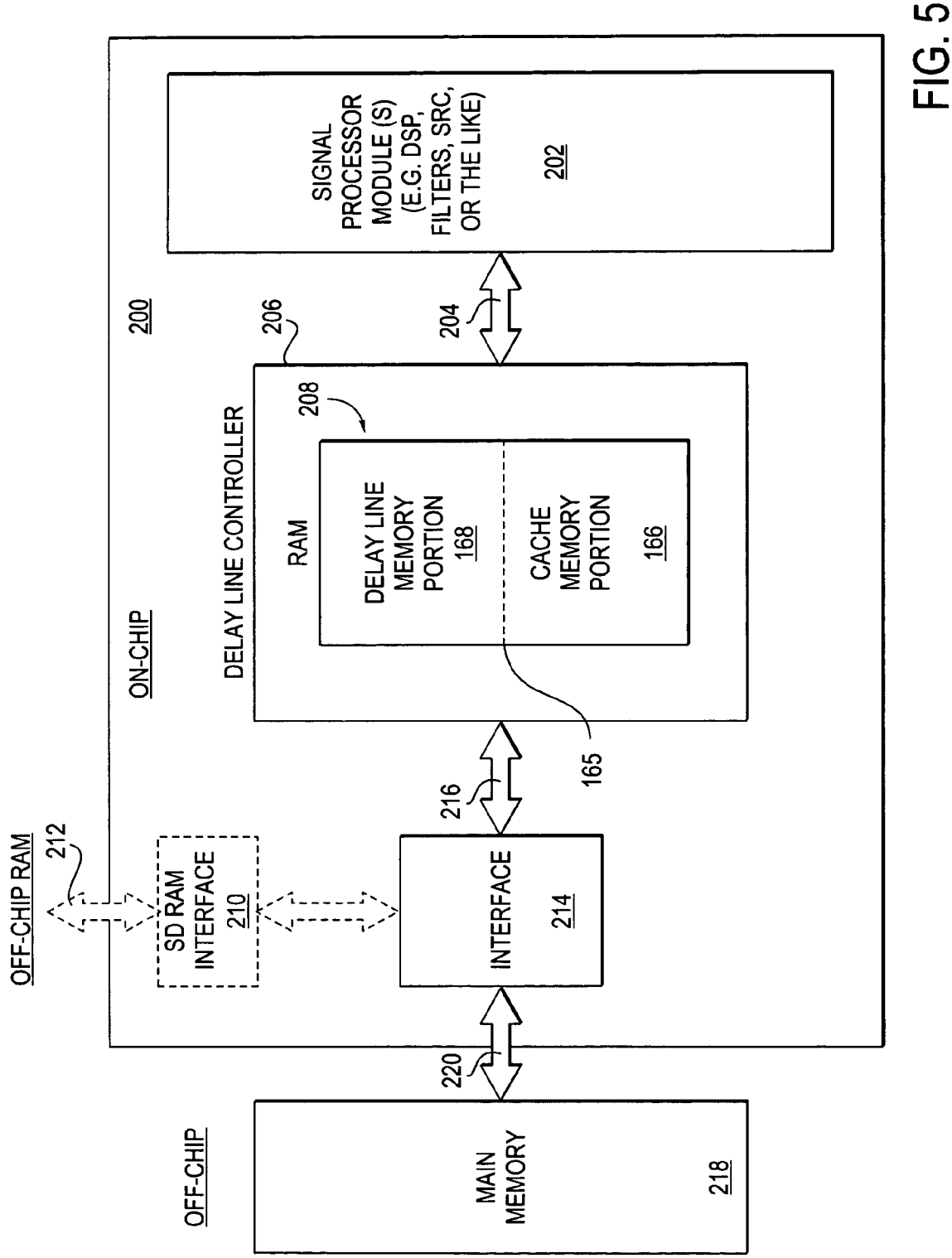
FIG. 5 shows a schematic block diagram of an exemplary circuit, in accordance with the invention, for implementing digital delay lines within external or main memory and on-chip memory.

Referring to FIG. 5 of the drawings, reference numeral 200 generally indicates a further embodiment of a digital signal processing subsystem, in accordance with the invention. The subsystem 200 may resemble the signal processing subsystem 160 and, in one embodiment, may form part of (or be fully implemented by) an integrated circuit or chip. The subsystem 200 includes at least one digital signal processor module 202 connected via a bus 204 to a delay line cache controller 206. As described in more detail below, the signal processor module 202 may communicate data samples to the delay line cache controller 206 which, using external and/or internal delay lines, delays the digital samples. In one embodiment, the delay line cache controller 206 includes on-chip or local memory such as circuit memory 208 that has a delay line memory portion 168 and a cache memory portion 166. The circuit memory 208 may be, for example, a 64 kilobyte RAM circuit provided on a silicon wafer on which the subsystem 200 is defined. It will, however, be appreciated that the circuit memory 208 need not necessarily form part of the delay line controller 206 but may be formed anywhere locally on the subsystem 200.

In one embodiment, the sizes (e.g., the relative sizes) of the delay line memory portion 168 and the cache memory portion 166 may be adjusted as generally indicated by a boundary pointer 165. Thus, in use, an amount of memory that the delay line memory portion 168 uses of the available memory provided by the circuit memory 208 may vary and, accordingly, an amount of memory of the circuit memory 208 used by the cache memory portion 166 may also vary. In one embodiment, all memory of the circuit memory 208 is allocated between the delay line memory portion 168 and the cache memory portion 166.

In certain embodiments, the subsystem 200 may optionally include an SDRAM interface 210 for interfacing off-chip SDRAM to the subsystem 200 via a bus 212. It will, however, be appreciated that the circuit memory 208 (or any off-chip memory) need not be limited to RAM or random access memory but may be any type of memory for storing digital data.

The subsystem 200 also includes an interface 214 connected to the delay line cache controller 206 via a bus 216. The interface 214 is also connectable to external or main memory 218 that is off-chip, or to the off-chip RAM via the bus 212. The main memory 218 may correspond to the main memory 154 (see FIG. 2) and, accordingly, a communication bus 220 that connects the main memory 218 and the interface 214 may correspond to the bus 152 (see FIG. 2). In a similar fashion, the circuit memory 208 may correspond to the circuit memory 164 of FIG. 2.

In the exemplary configuration of the subsystem 200 shown in FIG. 5, the signal processor module 202 may represent any one or more signal processing modules for processing digital signals, e.g., digital audio signals. For example, the digital signal processor module 202 may include a sample rate converter module, a filter module, a digital signal processor (DSP) module, or any other module required to process digital audio signals. It is, however, to be appreciated that the invention applies equally to the digital processing of other digital signals such as video signals. In these circumstances, the digital signal processor module 202 may then represent any one or more video signal processing modules or circuits. In one embodiment, the filter module, sample rate converter module, and the like may be connected to a DSP which then communicates or implements any delays required by any one or more of the modules including delays of digital signals required by the DSP. As described above, the host system (e.g., the computer system 100) to which the subsystem 200 is connectable may include a DSP program (e.g., the DSP program 176) for executing various algorithms to process the digital signals (e.g., audio and/or video signals and/or any other digital signals).

Figure 6:
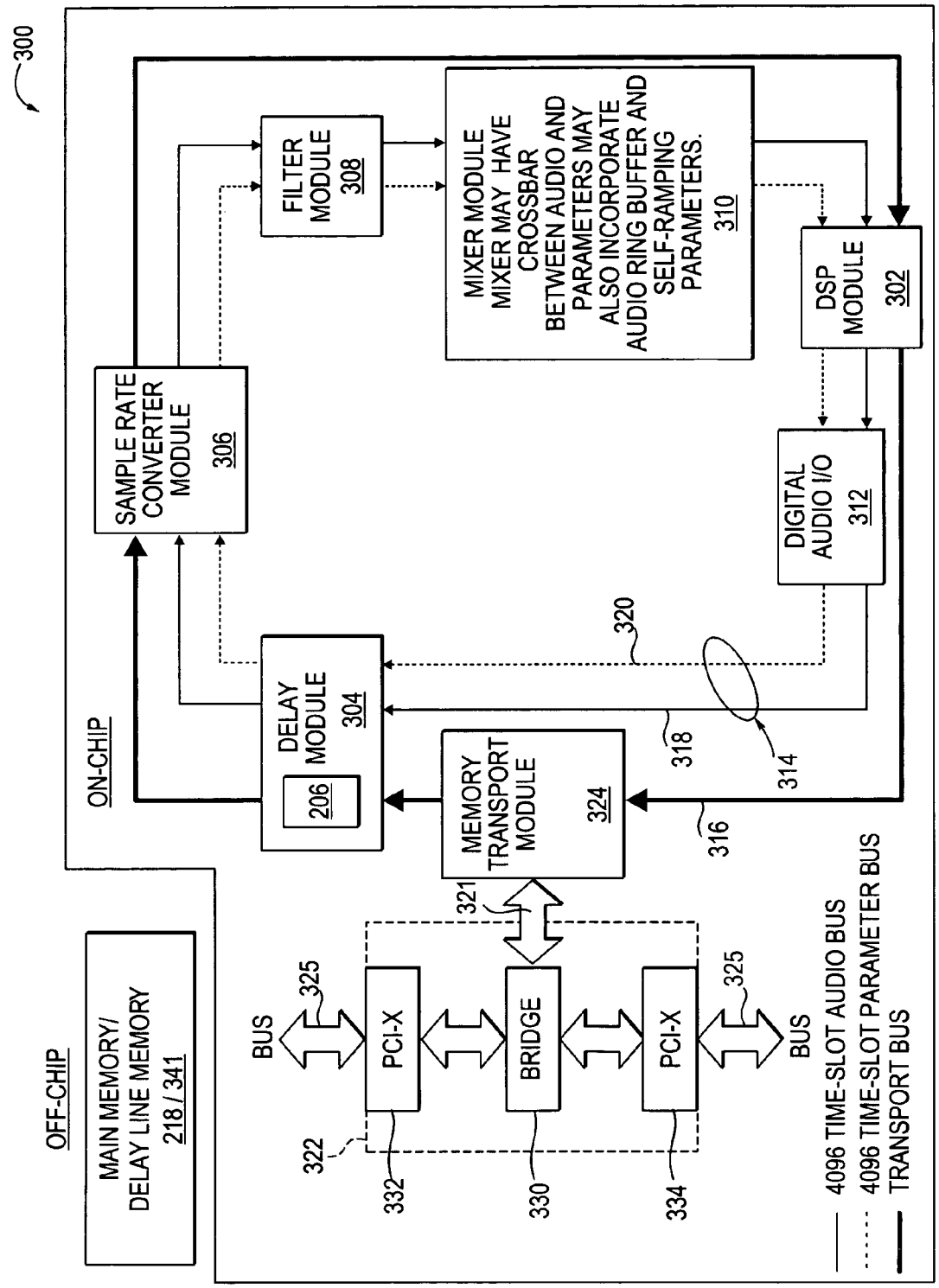
FIG. 6 shows a schematic block diagram of an exemplary circuit, in accordance with the invention, for implementing digital delay lines used by various signal processing modules arranged in a ring configuration.

Referring to FIG. 6, reference numeral 300 generally indicates a further exemplary embodiment of a digital signal processing subsystem, in accordance with the invention. The subsystem 300 may be in the form of a digital processing circuit including a plurality of digital signal processing modules arranged in a ring or circular fashion. For example, the subsystem 300 may include a DSP module 302, a delay module 304 including a delay line controller (e.g., a delay line cache controller 206), a sample rate converter module 306, a filter module 308 and a mixer module 310. Further, the subsystem 300 may include a digital audio input/output (I/O) module 312. The various modules 302 to 312 are interconnected by a data bus 314 and a transport bus 316. The data bus 314 may include an audio bus 318 and a parameter bus 320. It is, however, to be appreciated that the invention is not limited to a configuration of modules that are arranged in a ring but applies in any situation where one or more signal processor modules communicate directly or indirectly with circuitry or components implementing delay lines (e.g., as shown in FIG. 5).

In one embodiment, the subsystem 300 also includes a transport control or bus interface 322 connected via a transport bus 321 to a memory transport module 324. The memory transport module 324 is connected via the transport bus 316 to the delay module 304, the sample rate converter module 306, and the DSP module 302. Accordingly, any one of the exemplary modules 302, 304, and 306 may communicate data to a host system (see for example the computer system 100 of FIG. 1) via the transport control interface 322. The transport control interface 322 may be integrally formed on-chip with the other modules of the subsystem 300.

As described in more detail below, any one of the modules 306, 308, 310, 302, and 312 can communicate digital data samples, which are to be delayed, to the delay module 304. Typically, the modules 306, 308, 310, 302, and 312 communicate digital data samples representative of, for example, audio data that is to be delayed using the delay module 304. As described above and in more detail below, the delay module 304 may then implement delay lines directly within its circuit memory 164 (e.g., its delay line memory portion 168 when included in a particular embodiment) and/or in the main memory 218 via the cache memory portion 166.

Figure 7:
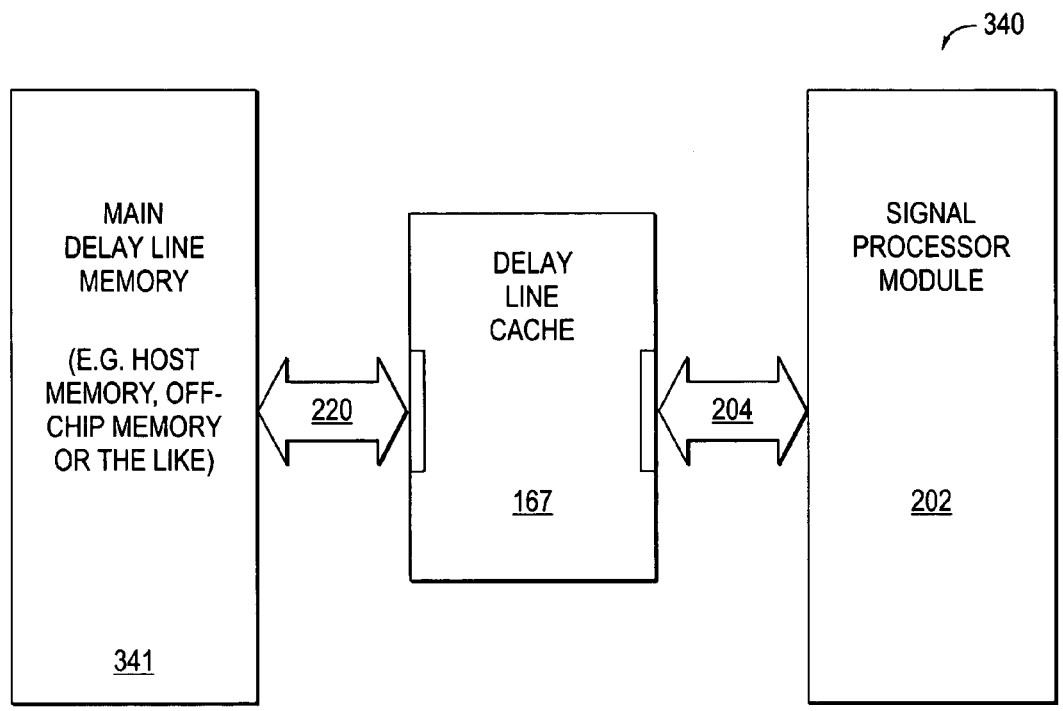
FIG. 7 shows a schematic block diagram of an exemplary digital processing subsystem, in accordance with the invention, including external digital delay lines provided in main delay line memory and interfaced to a signal processor module via delay line cache.

Referring in particular to FIG. 7, reference numeral 340 generally indicates an exemplary digital processing subsystem, in accordance with the invention, to implement external digital delay lines in main delay line memory 341 interfaced to a signal processor module via delay line cache. The digital processing subsystem 340 includes an exemplary signal processor module 202 that communicates with an exemplary delay line cache 167 via a communication bus 204. The delay line cache 167communicates via a communication bus 220 (e.g. a PCI bus) with the main delay line memory 341. It will be appreciated by one skilled in the art that data samples may be stored in any memory and not merely in the host memory 218 and/or the off-chip RAM and the terms may be used interchangeably. Thus, for the purposes of this specification, the term "main delay line memory" is intended to include the host memory 218 and/or the off-chip RAM or memory. Thus, any reference to the "main delay line memory" in this specification may apply equally to any off-chip memory. In one embodiment, from a system point of view, different main delay line memory 341 (e.g., the host memory 218 and/or the off-chip RAM or memory) may be indistinguishable. The off-chip memory may be provided in a different chip but on the same card or circuit board. As discussed above with reference to FIG. 5, the signal processor module 202 and the delay line cache 167 may be integrated on a single chip defining a signal processing subsystem (e.g. a signal processing subsystem 200 or 300) that processes digital signals (e.g. audio and/or video data). In one embodiment, the delay line cache 167 communicates data samples, received from the main delay line memory 341), to the signal processor module 202 under control of a delay line controller, for example, the delay line cache controller 206 (see FIGS. 4 to 6). As described in more detail below, the delay line cache controller 206 may provide the exemplary signal processor module 202 with data samples upon request or based on an identifier (e.g. an address identifier) received from the signal processor module 202. As discussed above, the signal processor module 202 may, for example, be defined by a filter module, a sample rate converter module, a DSP module, a mixer module, or any circuitry processing digital data that requires a delay in data samples. Further, in one embodiment, a plurality of signal processing modules (e.g., the modules 306, 308, 310, 302, 312 shown in FIG. 6) is arranged in a ring configuration.

Exemplary Primary/Secondary Delay Line Cache Arrangement

Figure 8:
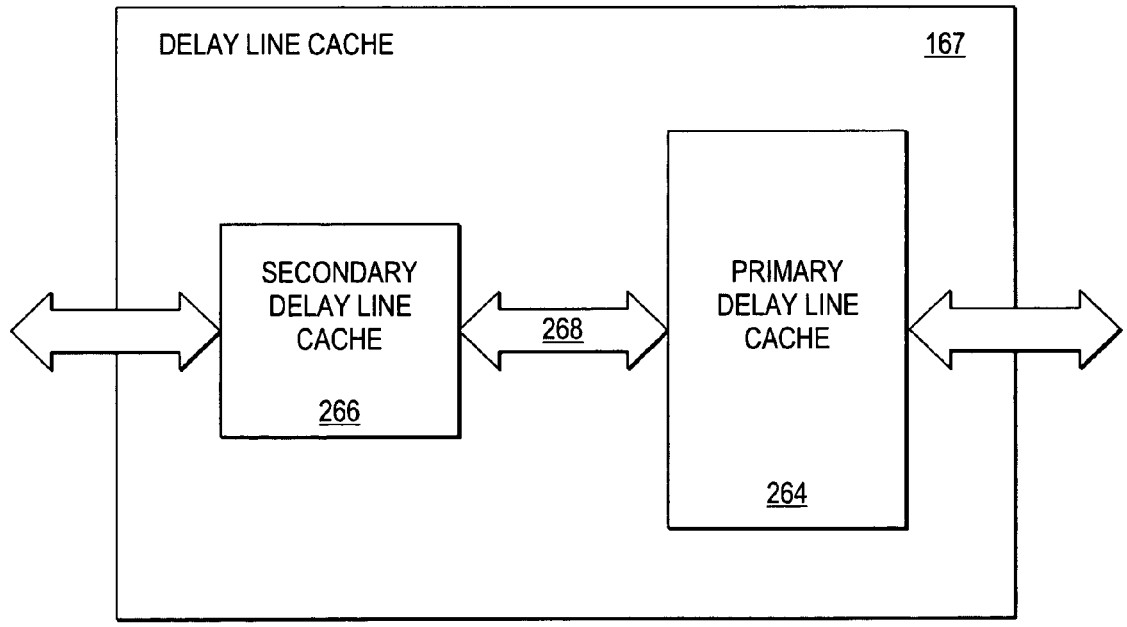
FIG. 8 shows a schematic block diagram of a delay line cache in accordance with the invention.

According to a further aspect of the invention, as shown in more detail in FIG. 8, the delay line cache 167 may include a primary delay line cache 264 and a secondary delay line cache 266 connected via a communication link 268. In one embodiment of the invention, the primary delay line cache 264 and the secondary delay line cache 266 are provided on a single integrated circuit or chip and, accordingly, the communication link 268 may be an on-chip bus which links the secondary delay line cache 266 and the primary delay line cache 264.

Exemplary Primary Delay Line Cache

In one embodiment of the invention, the primary delay line cache 264 includes a plurality of delay caches each of which, for example, are dedicated to a channel provided on the audio bus 318 of the digital processing subsystem 300. As mentioned above, the delay line cache 167 may be used in the digital signal processing subsystem 200 wherein the signal processor module or modules 202 communicate directly with the main memory 218, or in the digital signal processing subsystem 300 where a plurality of digital signal processing modules are arranged in a ring configuration. Although the application of the delay line cache 167 may apply equally in either configuration, its application in the digital signal processing subsystem 300 is described below by way of example.

When the delay line cache 167 forms part of the delay module 304 (see FIG. 6) of the signal processing subsystem 300, the primary delay line cache 264 may communicate with any one or more of the modules 302, 306, 308, and 310 via the audio bus 318 and the parameter bus 320.

Figure 9:
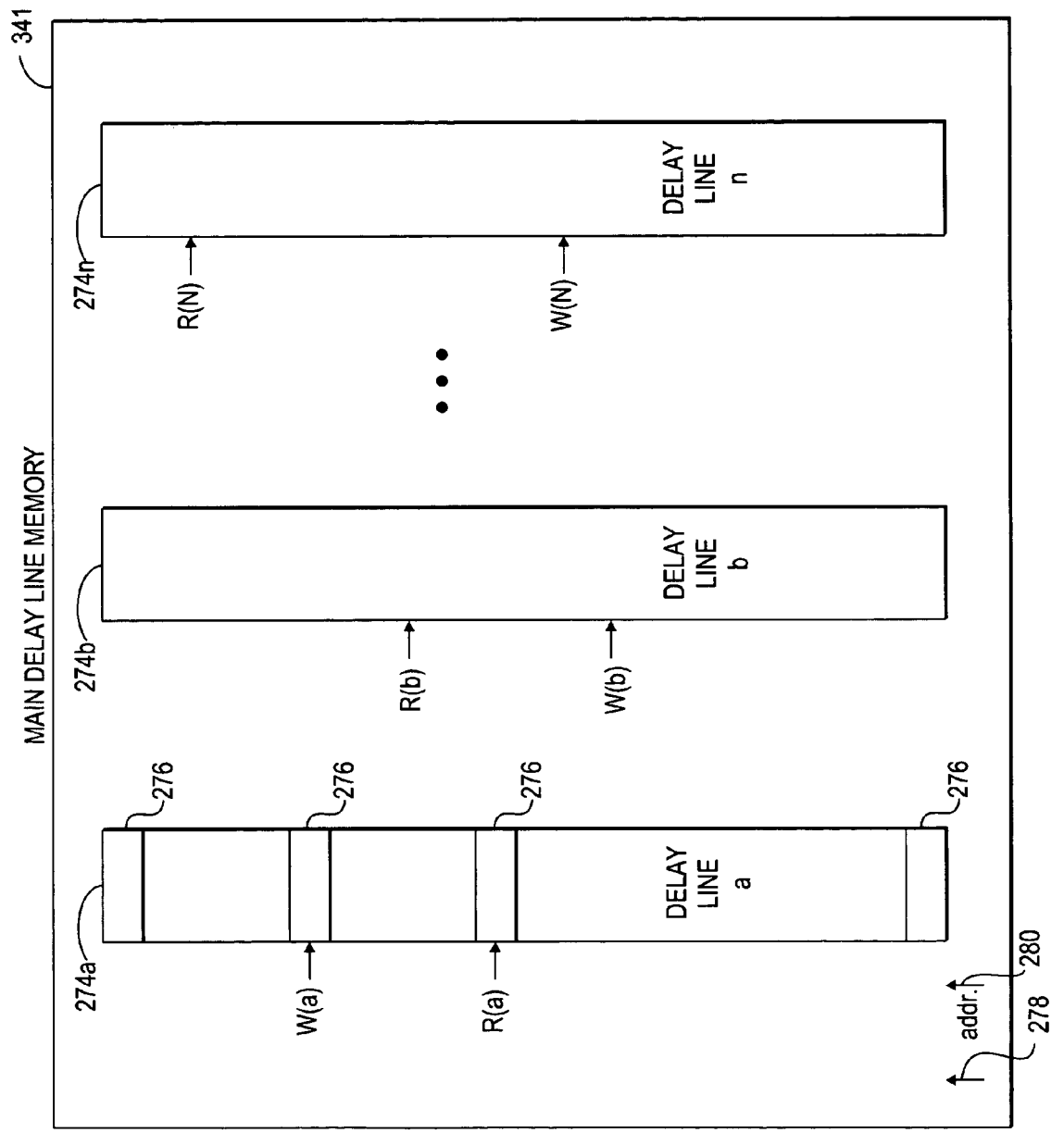
FIG. 9 shows a schematic representation of the implementation of multiple external delay lines within a main delay line memory.
Figure 10:
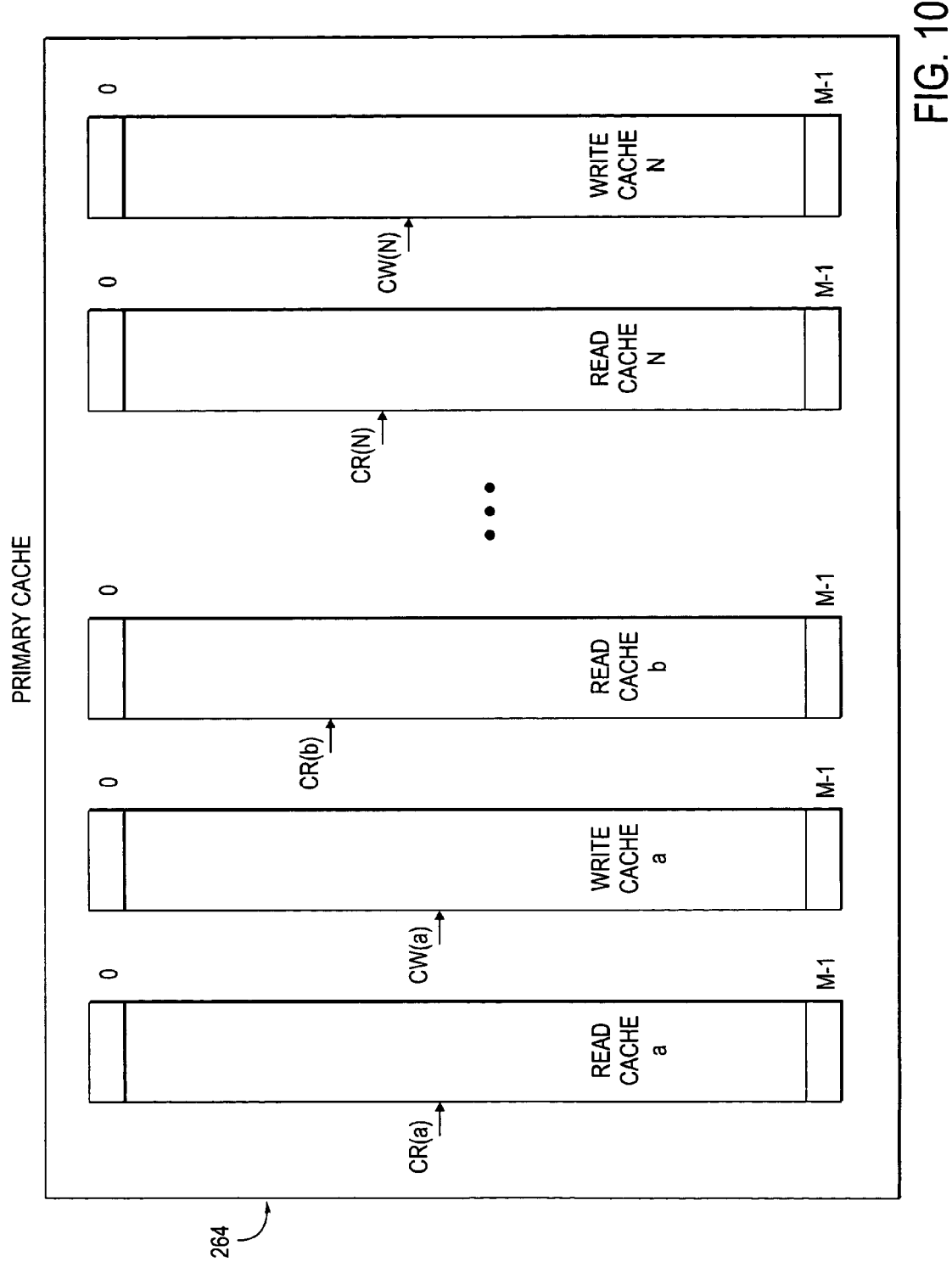
FIG. 10 shows a schematic representation of exemplary multiple primary cache lines implemented in cache memory.
Figure 11:
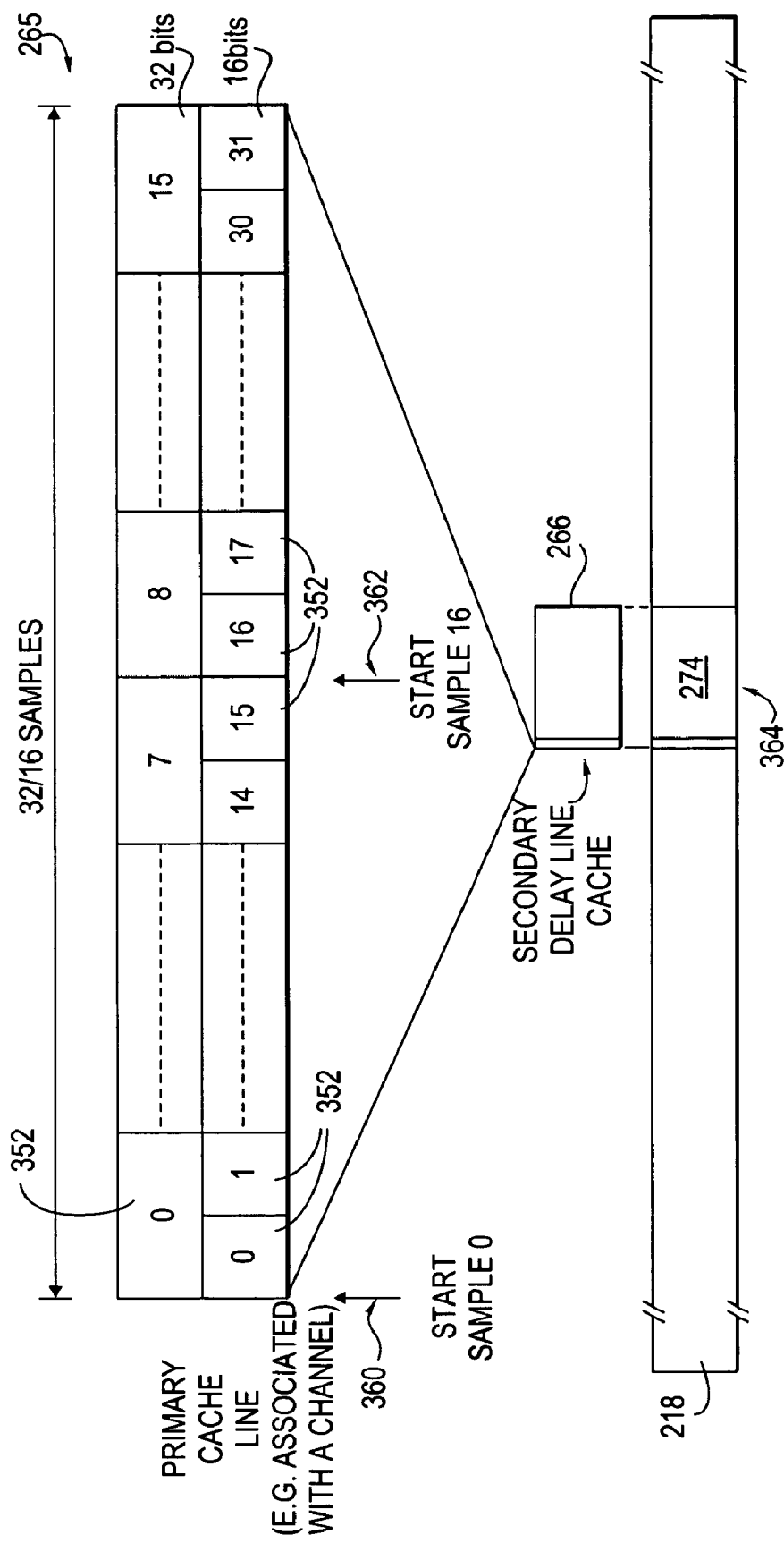
FIG. 11 shows a schematic representation of exemplary primary and secondary delay line caches, in accordance with the invention.

FIG. 9 shows an exemplary layout of a plurality of delay lines in the main delay line memory 341. In the exemplary embodiment, delay lines 274*a* to 274*n* are shown to include memory locations 276. It will be appreciated that the number of memory locations in each delay line 274 is dependent upon the length of the delay to be implemented in the delay line 274. As shown by time arrow 278 and address arrow 280, time and physical address locations increment in the same direction in the exemplary delay lines 274. In particular, each delay line 274 begins with a write (W(a)–W(n)) operation to a higher address and ends with a read (R(a)–R(n)) operation from a lower address. As time and physical addresses increment together, a read (R(a)–R(n)) operation will eventually occur at the address of a write (W(a)–W(n)) operation that occurred in the past. In this way, the result of the read operation has a time delay relative to the write operation. Thus, in one embodiment, digital data (e.g. audio data, video data, or any other digital data to be delayed) is written to the main delay line memory 341 in an ascending address order and so the start of a delay line 274 is at a lower address and, accordingly, the end of the delay line 274 is at a higher address. As mentioned above, the primary delay line cache 264 may be cache dedicated per channel. In one embodiment of the invention, each channel of the data bus 314 has its own dedicated primary cache line 265 (e.g. a 64-byte cache that may accommodate 32 16-bit samples or 16 32-bit samples—see FIG. 11).

In the exemplary implementation of the delay line cache 167 in the digital processing subsystem 300, any one of the modules 302, 306, 308, and 310 may provide data samples on the audio bus 318 (and parameters on the parameter bus 320 to control processing of the data samples) for communication to the delay module 304. When the data samples are provided in channels, the audio bus 318 may provide channel in service data (e.g. identifying a channel when the data bus 314 is time-multiplexed) that identifies memory locations for servicing in the primary delay line cache 264. As described in more detail below, the least significant bits (LSB) of a primary delay line cache address may be sourced from the delay memory logical address, and the most significant bits (MSB) may come from a channel in service indicator.

Figure 12:
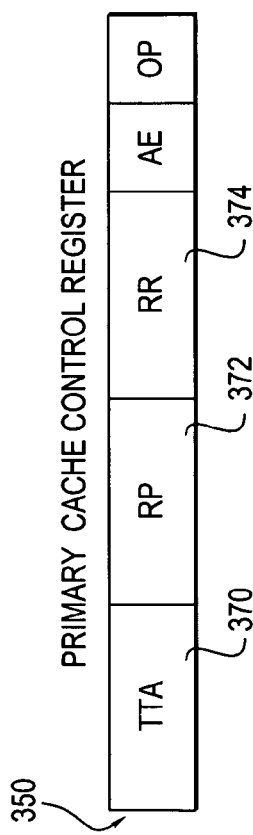
FIG. 12 shows an exemplary primary cache control register to control operation of the primary delay line cache.

Referring in particular to FIG. 12, reference numeral 350 generally indicates an exemplary primary cache control register to control read and write accesses to the primary delay line cache 264. As mentioned above, in one embodiment each primary cache line 265 may be a 64-byte cache that can accommodate data samples 352 (only a few of which are referenced in FIG. 11), for example, thirty-two 16-bit samples or sixteen 32-bit samples. It will be noted from FIG. 11 how, in one embodiment, the 32-bit samples may align in the cache relative to 16-bit samples. Each primary cache line 265 may correspond to a delay line 274 in the main delay line memory 341. However, the exemplary primary cache line 265 does not represent an entire delay line 274 in the main delay line memory 341. It represents a subset of data from the main delay line memory 341. A primary cache line 265 may thus mirror data samples in a portion of the main delay line memory 341. Thus, each primary cache line 265 may resemble a sliding window 364 into a single delay line provided in the external or main delay line memory 341. In order to identify the position of the window 364, and thus identify specific memory locations in the main delay line memory 341 providing a delay line, an external or main memory address 369 may be used (see FIG. 13). In one embodiment, the external or main memory address 369 may optionally be a logical address that can be translated to a physical address using a page table or other translation means.

In particular, in one embodiment of the invention, the least significant 4 or 5-bits 368 of a delay memory logical address 366 may be equal to the cache read/write address of a corresponding primary cache line (see FIG. 13) in the primary delay line cache 264, the number of bits depending on whether the delay line contains sixteen 32-bit samples or thirty-two 16-bit samples. As described in more detail below, when it is detected that less than a minimum number of samples remain unread in the primary delay line cache 264, the primary delay line cache 264 (and thus the primary cache line 265) may be replenished with data, via the secondary delay line cache 266, from the main delay line memory 341. In the exemplary primary cache line 265 including, for example thirty-two 16-bit samples 352, when it is detected that 16 (or fewer) samples remain unread (e.g. by circuitry in the delay module 304) the delay line cache logic (e.g. via the delay line cache controller 206) may generate a request to the secondary delay line cache 266 for 16 (or fewer) samples (e.g. eight DWORDS).

In order to service the primary delay line cache 264 with samples to replenish those that have already been read, in one embodiment of the invention, the secondary delay line cache 266 may issue a request for data samples from the main delay line memory 341. For example, in the present example, a request for 16 samples or eight DWORDS may be issued and, accordingly, two possible start addresses within each primary cache line 265 may be used, for example, 0 and 16 as generally indicated by arrows 360 and 362 respectively, (see FIG. 11). Accordingly, when samples 0 to 15 have been read, then the delay line controller logic may require a burst of fresh samples from the main delay line memory 341 to replace the samples 0 to 15 that have just been read by the primary delay line cache 264.

It will be appreciated that, once sample number 16 has been read, samples 0 to 15 can be discarded since addresses must proceed in a monotonically increasing manner. Accordingly, when the delay module 304 communicates (e.g. via the audio bus 318) sample 16 to the signal processor modules 302, 306, 308, 310, 312, bit 4 (16=binary 10000) of the delay memory logical address (which corresponds to the addressing of the primary delay line cache 264) may act as a trigger (e.g., a trigger signal) to retrieve data from the secondary delay line cache 266 to replace data in samples 0 to 15 of the primary delay line cache 264. Likewise, once sample 0 has been communicated to the audio bus 318 by the delay module 304, the delay line controller logic may then discard samples 16 to 31 and, accordingly, bit 4 of the memory logical address would then be equal to 0 which, in turn, may then trigger replacement of the data in samples 16 to 31 with data sourced from the secondary delay line cache 266. Thus, in one embodiment, one or more bits in the address of a primary cache line 265 in the primary delay line cache 264 may trigger the updating of sample data that has already been processed or read (e.g., passed onto the audio bus 318 by the delay module 304).

In one embodiment of the invention, the primary cache control register 350 may store a 1-bit field that identifies a trigger address (TTA) bit 370 (see FIG. 12). In the signal processing subsystem 300, the trigger address may be regarded as a transport trigger address as sample data is communicated to and from the main delay line memory 341 via the transport bus 316. It will be appreciated that the TTA field need not be limited to one bit, but may be any number of bits. The choice of number of bits may depend on the transport latency, size of primary cache, overall bandwidth requirements, total available bandwidth, or the like.

In one exemplary embodiment where 32 samples are provided in each primary cache line 265, when bit 4 of the delay line memory address matches the transport trigger address bit 370, and no request is pending, a request to obtain further sample data from the main delay line memory 341 may be generated. For example in the embodiment shown in FIG. 6, the delay module 304 may request data from the main delay line memory 341 via the transport bus 316 and the audio memory transport module 324. When bit 4 of the delay line memory address of a particular audio channel (identifying memory locations in an associated primary cache line 265) matches the transport trigger address bit 370 of the primary cache control register 350, and no request is pending, the primary delay line cache 264 may submit a request to the secondary delay line cache 266, a request pending (RP) bit 372 of the primary cache control register 350 may be set and the transport trigger address bit 370 may be incremented.

Exemplary Primary Cache Line Request Generation Method

Figure 14:
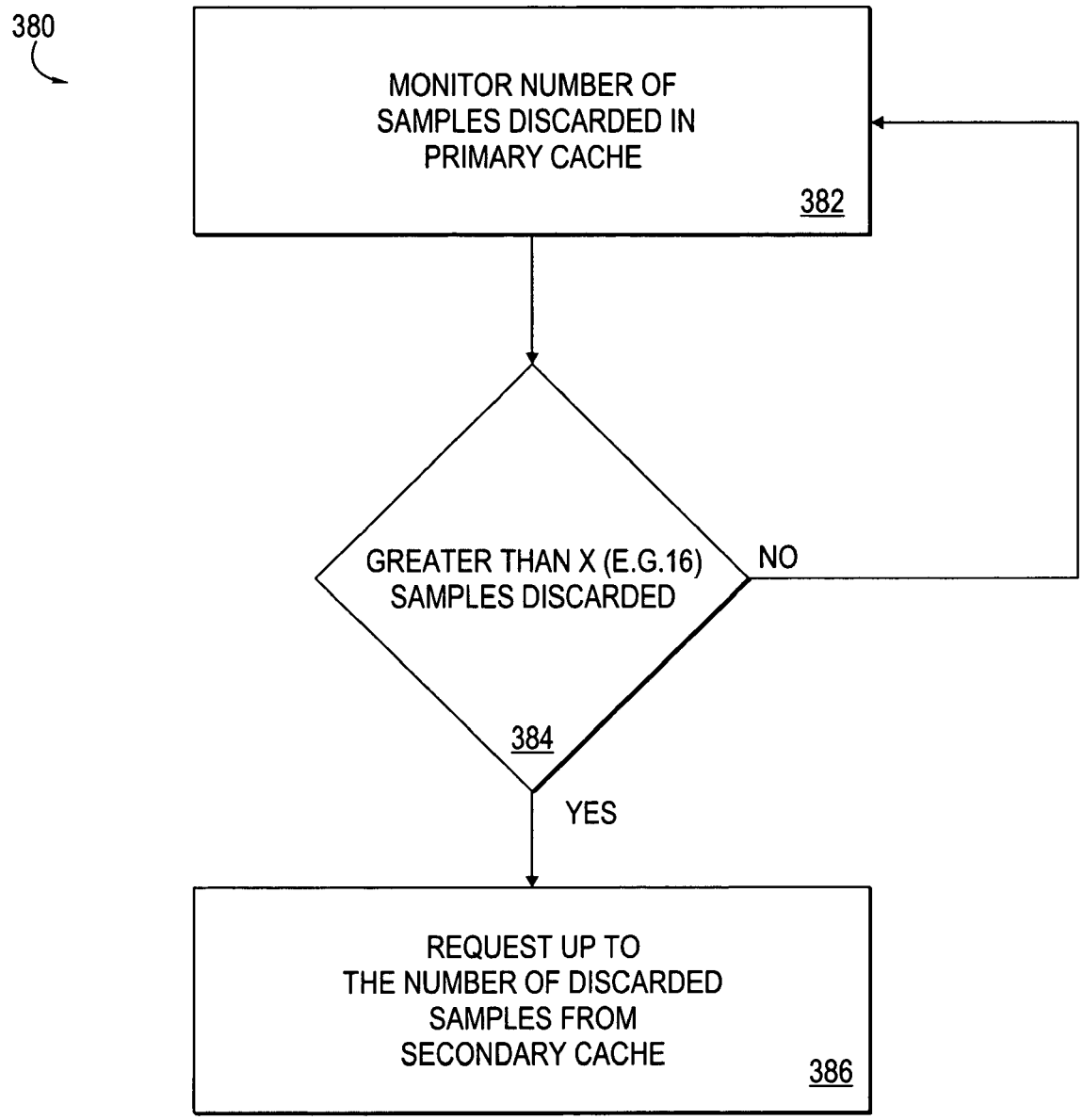
FIG. 14 shows an exemplary method of implementing request logic for updating primary delay line cache memory with sample data from secondary delay line cache memory.

Referring to FIG. 14, reference numeral 380 generally indicates an exemplary method, in accordance with the invention, for implementing request logic for updating primary delay line cache memory with sample data from the main memory. The method 380 may be used to update any number of samples (e.g., sample blocks) and is not restricted to blocks of 16 samples, as described by way of example above. The method 380 may, for example, be used to read any number and configuration of data samples from the delay lines 274 (see FIG. 9) in the main delay line memory 341, via the secondary delay line cache 266, into the primary delay line cache 264 provided, for example, in the exemplary delay module 304.

As shown at operation 382, a controller (e.g. the delay line cache controller 206) may, for example, monitor the number of discarded samples remaining in a primary cache line 265. The term "discarded samples" is intended to include samples which have already been read or used and thus the value of the sample may no longer be of any significance.

In one embodiment of the invention as described above, each primary cache line 265 is divided into at least two sample blocks (e.g. sample blocks 0 to 15 and sample blocks 16 to 31) that are refreshed (via the secondary delay line cache 266) with read data from the main delay line memory 341 in a burst fashion. For example, when there are greater than a chosen number (e.g. 16) of discarded samples remaining in any primary cache line 265, then the delay line cache controller 206 may request up to the number of discarded samples from the main delay line memory 341 (see decision operation 384). For simplicity, the delay line cache controller 206 may simply request the chosen number (e.g. 16) of samples, even if the primary delay line cache contains more than this number of discarded samples. If, however, less than the chosen number of discarded samples remain in the primary cache line 265, then the method 380 returns to operation 382.

Exemplary Secondary Delay Line Cache

Figure 15:
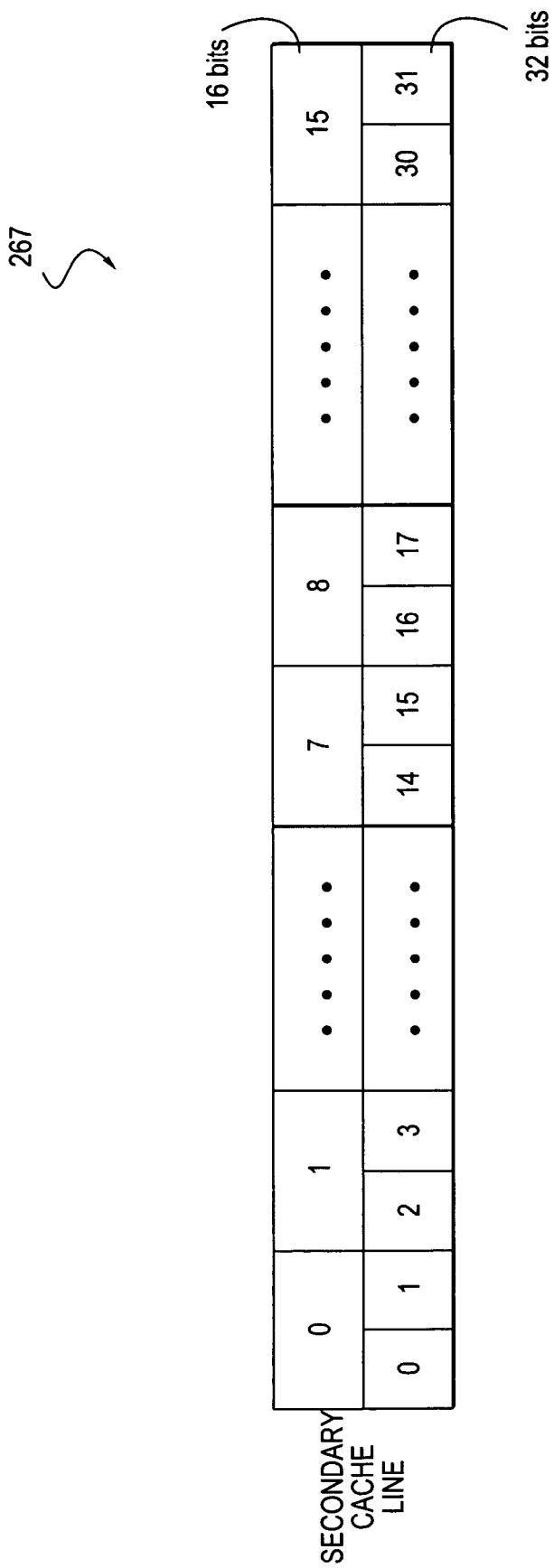
FIG. 15 shows a schematic representation of multiple secondary cache lines implemented in cache memory.

The secondary delay line cache 266 may include a plurality of secondary cache lines 267 (see FIG. 15) that are arranged dynamically per address associated with the main delay line memory 341. When the delay line cache 167 forms part of the delay module 304 (see FIG. 6) of the signal processing subsystem 300, the secondary delay line cache 266 may communicate with the main delay line memory 341 via the transport bus 316. In one embodiment of the invention, as described in more detail below, each secondary cache line 267 has a secondary cache line address tag 367 (see FIG. 13) corresponding to its start address within the main delay line memory 341. In one embodiment, the address tag is used both to request a read or a write operation with main delay line memory 341 and to facilitate matching incoming requests from the primary delay line cache 264. Thus, in certain circumstances as described in more detail below, a request from a primary cache line 265 that has a matching address may be fulfilled immediately from the matching secondary cache line 267.

Circumstances may arise in which the secondary delay line cache 266 will reject a request for samples from the primary delay line cache 264 if no cache lines are available in the secondary delay line cache 266 for use. By way of example, there may be a small number (e.g. 16) of secondary cache lines 267 relative to the number of primary cache lines (e.g. 1024). In this case, it is likely that the primary delay line cache 264 will submit more requests (e.g. more than 16) than the secondary delay line cache 266 can hold. Thus, when the primary delay line cache 264 submits a $17^{th}$ request before any of the first 16 have been fulfilled, no cache lines may be available in the secondary delay line cache 266. In that case, the request may be rejected. In one embodiment, under these circumstances the delay line cache controller 206, in response to a request being rejected, may set a request rejected bit (RR) 374 in the primary cache control register 350. Accordingly, the request rejected bit 374 may indicate that the request from the primary delay line cache 264 should be regenerated regardless of a current state of the request pending bit 372, and that the comparison with the transport trigger address bit 370 should be ignored.

In certain embodiments, the primary cache lines 265 in the primary delay line cache 264 may be set up for read-sum-and-write operations. In one embodiment of the invention, the read-sum-and-write operations may be performed in a burst fashion during a burst write to the secondary delay line cache 266. For example, the secondary delay line cache 266 may perform a burst read (from the main delay line memory 341), a summation (in the secondary delay line cache 266), followed by a subsequent burst write back to the main delay line memory 341, as described in more detail below. For example, in the signal processing subsystem 300, the burst read and subsequent burst write may be via the transport bus 316 and the memory transport module 324.

Once a data transfer operation between the primary delay line cache 264 and the secondary delay line cache 266 via the bus 268 is completed (see FIG. 8), the primary delay line cache 264 (or the delay line cache controller 206) may clear the request pending bit 372. In one embodiment, as far as the primary delay line cache 264 is concerned, the data transfer operation to the secondary delay line cache 266 is regarded as complete even if the secondary delay line cache 266 has not transferred the data to the main delay line memory 341 (e.g. via the transport bus 316). Accordingly, the secondary delay line cache 266 may be responsible for finalizing the data communication to the main delay line memory 341 and no explicit notification or acknowledgement that the transfer of the data to the main delay line memory 341 may be provided to the primary delay line cache 264. Thus, in one embodiment, the primary delay line cache 264 may only "see" the secondary delay line cache 266 and not the main delay line memory 341.

Exemplary Management of Primary Cache Requests

As mentioned above, the secondary delay line cache 266 may be provided between the main delay line memory 341 and the primary delay line cache 264. The secondary delay line cache 266 may accept a request from the primary delay line cache 264 and, in response thereto, generate transport requests for data from the main delay line memory 341. For example, in the digital processing subsystem 300, a transport request from the delay module 304 may be communicated to the audio memory transport module 324 via the transport bus 316. In one embodiment of the secondary delay line cache 266, 16 secondary cache lines 267 (see FIG. 15) may be provided each comprising, for example, eight DWORDS that are dynamically allocated and associated with addresses in the main delay line memory 341. As described in more detail below, in one embodiment the secondary delay line cache 266 provides a "window" to the data in the main delay line memory 341

Figure 16:
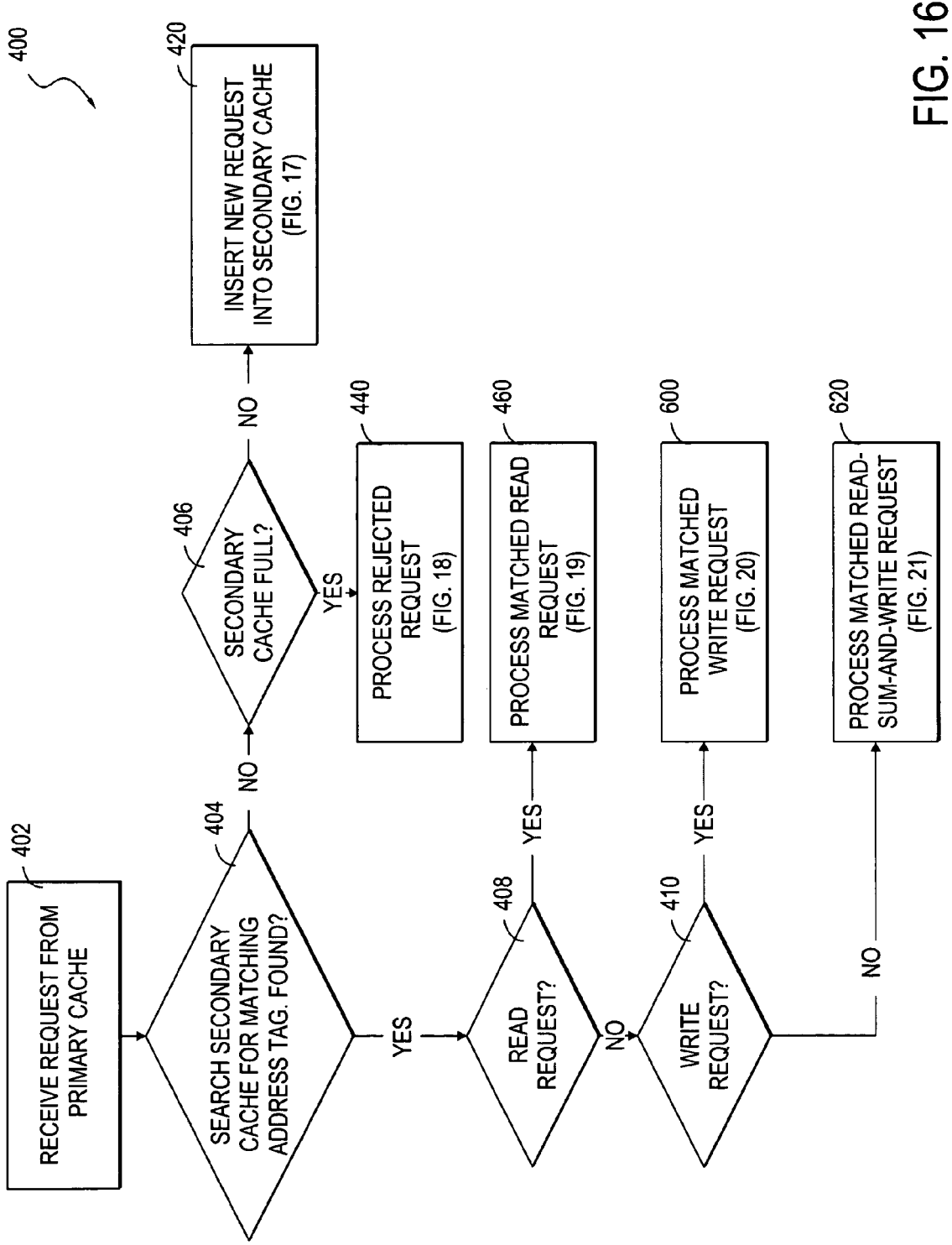
FIG. 16 shows an exemplary method, in accordance with the invention, for managing data in an exemplary delay line via primary and secondary delay line caches.

Referring in particular to FIG. 16, reference numeral 400 generally indicates an exemplary method, in accordance with the invention, for managing data in a delay line via primary and secondary caches. As shown at operation 402, when a request for data is received by the secondary delay line cache 266 from the primary delay line cache 264, a check is performed to determine if an address associated with the request matches an address tag of a secondary cache line 267 (see decision operation 404). If no match is found, then a check is performed to determine whether or not the secondary delay line cache 266 is full (see decision operation 406). If the secondary delay line cache 266 is not full, then the request from the primary delay line cache 264 may be inserted into a secondary cache line 267 according to an exemplary method 420, also in accordance with the invention (see FIG. 17). If, however, the secondary delay line cache 266 is full, then it may process the request as rejected according to an exemplary method 440, also in accordance with the invention (see FIG. 18). Referring back to decision operation 404, if the address associated with the request matches the address tag of a secondary cache line 267, then a further determination is made to select the appropriate method to process the new request. If the new request received at operation 402 is a read request (see decision operation 408), then the secondary delay line cache 266 processes a matched read request according to an exemplary method 460, also in accordance with the invention (see FIG. 19). If the new request received at operation 402 is a write request (see decision operation 410), then the secondary delay line cache 266 processes a matched write request according to an exemplary method 600, also in accordance with the invention (see FIG. 20). If the new request received at operation 402 is neither a read nor a write request, then the secondary delay line cache 266 processes a matched read-sum-and-write request according to an exemplary method 620, also in accordance with the invention (see FIG. 21).

Figure 17:
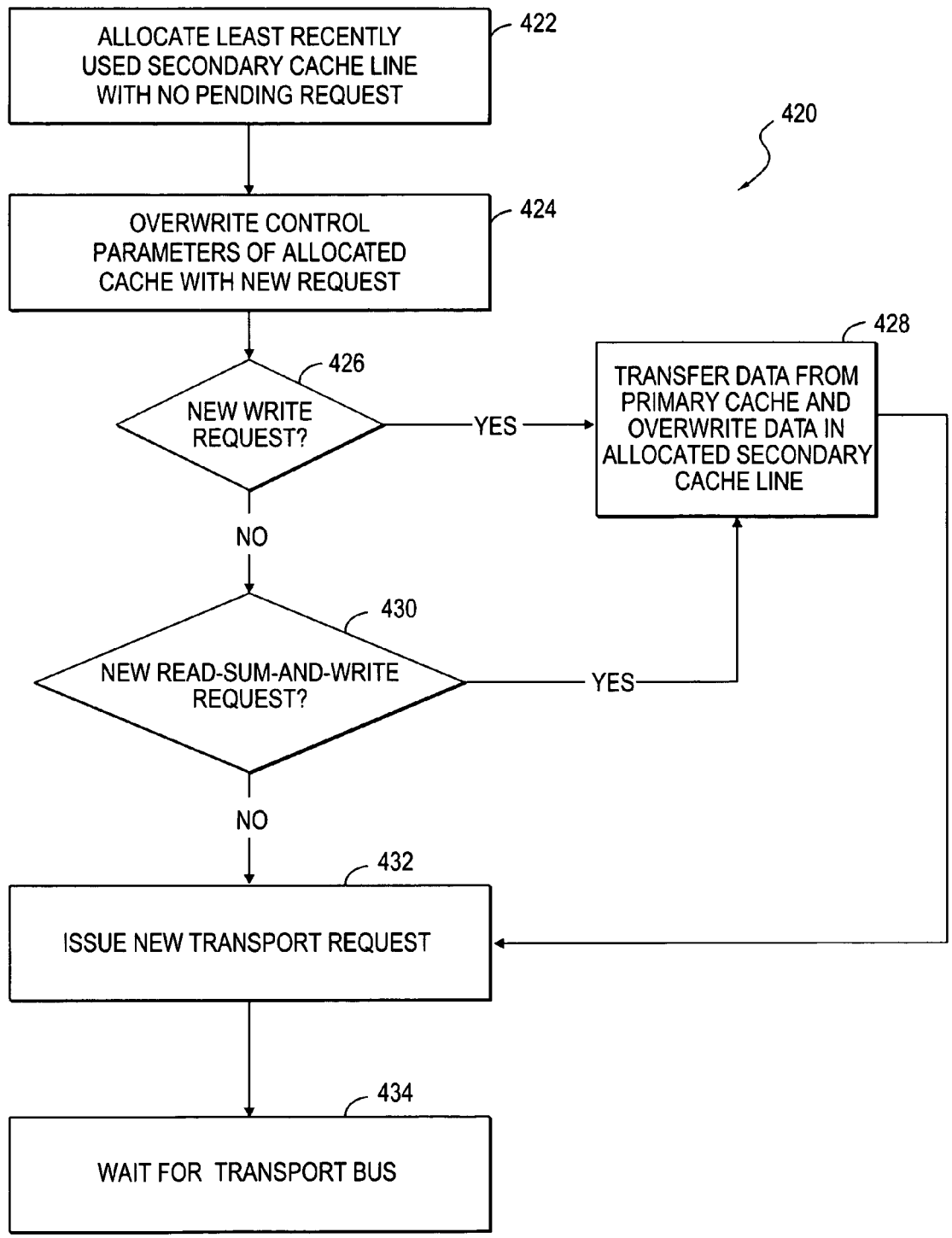
FIG. 17 shows an exemplary method, in accordance with the invention, for inserting a new request into a secondary cache line when an address does not match the address tag of any secondary cache line.

Referring to FIG. 17, reference numeral 420 generally indicates an exemplary method, in accordance with the invention, for inserting a new request into a secondary cache line 267 when the address does not match the address tag of any secondary cache line 267. In one embodiment, to provide an enhanced benefit from caching, the secondary delay line cache 266 allocates the least recently used secondary cache line 267 with no pending transport request as shown in operation 422. Then as shown in operation 424, the secondary delay line cache 266 may overwrite the control parameters of the allocated secondary cache line 267 with those of the new request. If the new request is a write request (see decision operation 426) or a read-sum-and-write request (see decision operation 430), then the secondary cache line 267 is immediately overwritten with data transferred from the primary delay line cache 264 (see operation 428). If the new request is a read request, or the data transfer operation 428 is complete, then the secondary delay line cache 266 issues a new transport request (see operation 432) and then waits for a response from the transport bus (see operation 434). Thus, the method 420 may be used to insert new requests from the primary delay line cache 264 into a secondary cache line 267.

Figure 18:
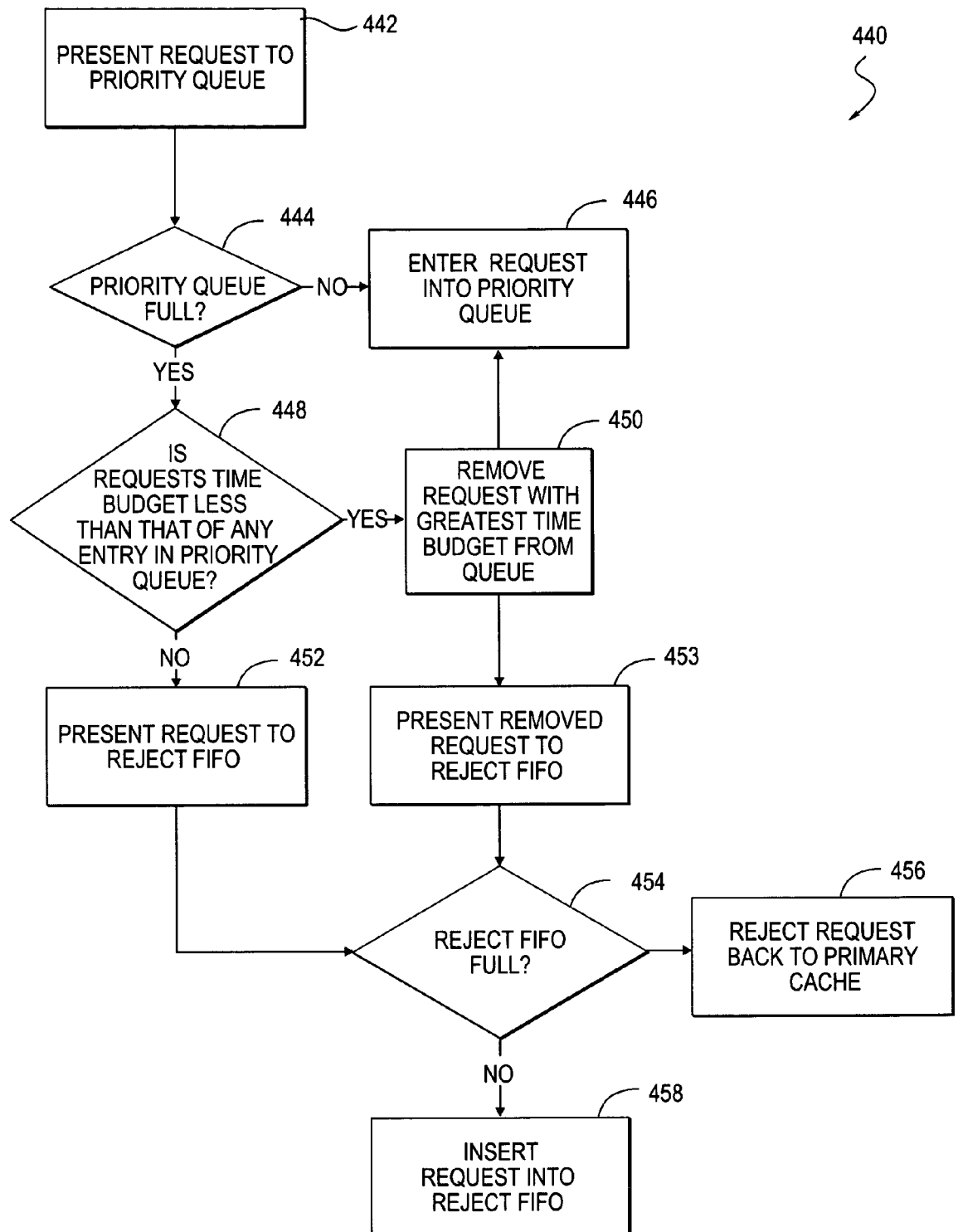
FIG. 18 shows an exemplary method, in accordance with the invention, for processing the rejection of a new request.

Referring to FIG. 18, reference numeral 440 generally indicates an exemplary method, in accordance with the invention, for processing the rejection of a new request. The secondary delay line cache 266 may first present the request to a priority queue as shown in operation 442. If the priority queue is not full (see decision operation 444), then the request is entered into the priority queue (see operation 446). If the priority queue is full, then it compares the time budget of the new request with the time budgets of the entries in the queue. If the time budget of the new request is less than that of at least one of those in the queue (see decision operation 448), the request with the greatest time budget may be removed from the queue at operation 450 and the new request may be entered into the queue at operation 446. Further, to improve performance when many requests are presented in quick succession followed by relatively long idle periods with no requests, requests may be entered into a reject FIFO rather than immediately rejected to the primary delay line cache 264. This reject FIFO may hold a plurality (e.g. 128) of requests in the order received without respect to the time budget. Thus, the request removed at operation 450 may be presented to a reject FIFO at operation 453. Referring back to decision operation 448, if the time budget of the new request is not less than that of any entry in the queue, the new request may be presented to a reject FIFO at operation 452. If the reject FIFO is full (see decision operation 454), the request presented to it, whether new or removed from the priority queue, may be rejected back to the primary delay line cache 264 at operation 456. If the reject FIFO is not full, the request presented to it may be inserted at operation 458. Thus, the method 440 may be used to process rejection of requests from the secondary delay line cache 266 back to the primary delay line cache 264.

Figure 19:
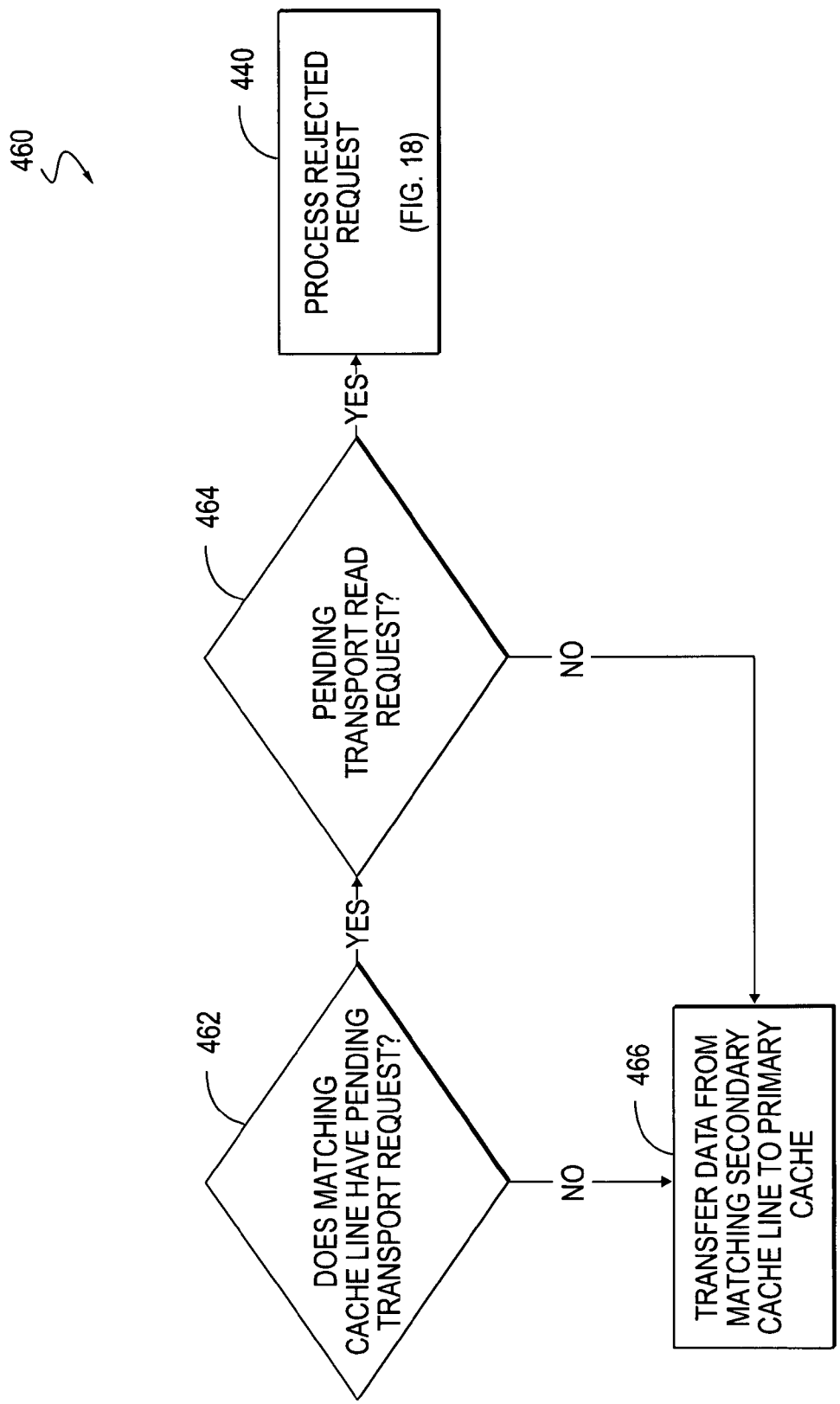
FIG. 19 shows an exemplary method, in accordance with the invention, of processing a read request by a primary delay line cache to read data from a secondary delay line cache when an address matches the address tag of a secondary cache line.

Referring to FIG. 19, reference numeral 460 generally indicates an exemplary method, in accordance with the invention, for processing a new read request that matches the address tag of a secondary cache line 267. If the matching secondary cache line 267 has no transport request pending (see decision operation 462), or the pending transport request is not a read request (see decision operation 464), then the secondary delay line cache 266 immediately transfers the data from the secondary delay line cache 266 to the primary delay line cache 264 as shown at operation 466, fulfilling the request. If the matching cache line has a pending transport read request, the new request is processed as rejected according to the method 440. It should be noted that in one embodiment the decision operation 464 compares the transport request type, not the primary cache request type. Thus, a read-sum-and-write primary cache request may have a pending transport read request, leading to rejection according to the method 440. Likewise, a read-sum-and-write request may have a pending transport write request, allowing data transfer at operation 466. For clarity, the text refers to primary cache requests as simply "requests" and to transport requests as "transport requests," "transport read requests," and "transport write requests". Thus, the method 460 may be used to process new read requests from the primary delay line cache 264 that match the address tag of a secondary cache line 267.

Figure 20:
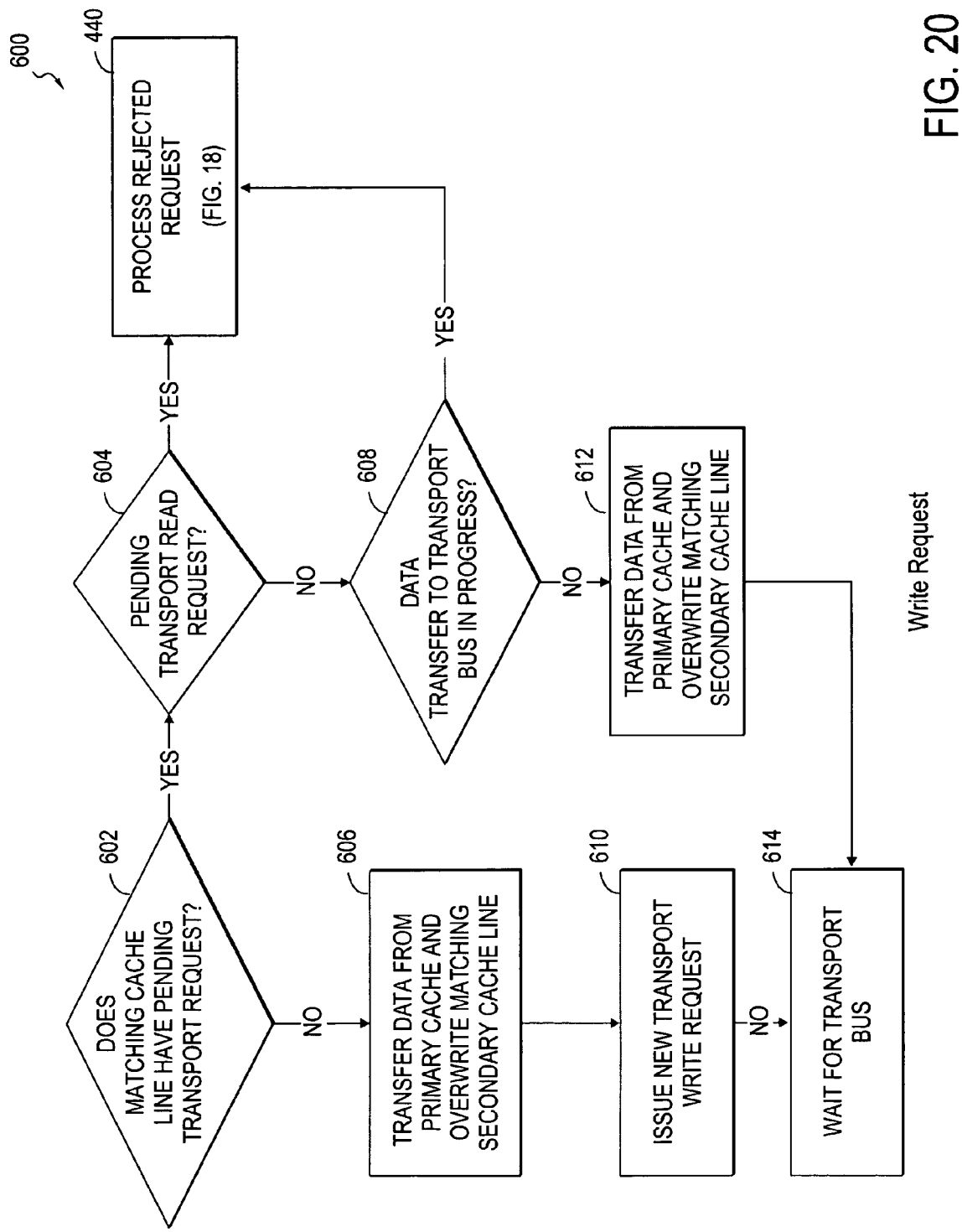
FIG. 20 shows an exemplary flow diagram of a method, in accordance with the invention, of processing a write request from a primary delay line cache to write data to a secondary delay line cache when the address matches the address tag of a secondary cache line.

Referring to FIG. 20, reference numeral 600 generally indicates an exemplary method, in accordance with the invention, for processing a new write request that matches the address tag of a secondary cache line 267. If the matching secondary cache line 267 has no transport request pending (see decision operation 602), then the secondary cache line 267 may be immediately overwritten with data transferred from the primary delay line cache 264 as shown at operation 606. Then the secondary delay line cache 266 may issue a new transport request in operation 610 and wait for the transport bus to respond as shown in operation 614. If, however, the matching cache line has a pending transport read request (see decision operation 604), the new request is processed as rejected according to the exemplary method 440. If the matching cache line has a pending transport write request and data transfer to the transport bus is in progress (see decision operation 608), the new request is processed as rejected according to the method 440. Otherwise, the secondary cache line 267 may be immediately overwritten with data transferred from the primary delay line cache 264 as shown at operation 612. In this case, a transport request was already pending, so the secondary delay line cache 266 may wait for the transport bus as shown in operation 614 as it had been prior to receiving the new matching request. Thus, the method 600 may be used to process new write requests from the primary delay line cache 264 that match the address tag of a secondary cache line 267.

Figure 21:
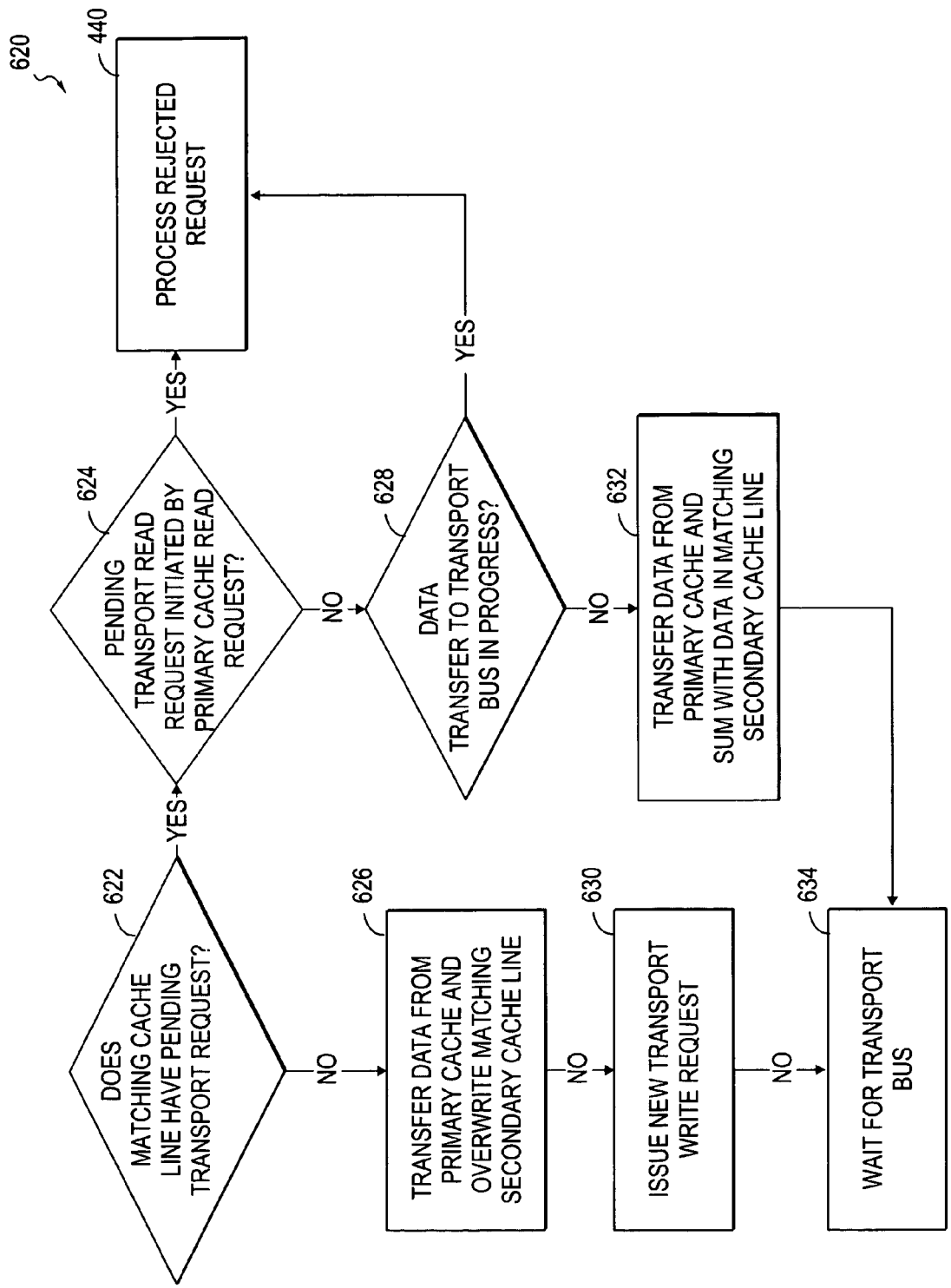
FIG. 21 shows an exemplary flow diagram of a method, in accordance with the invention, of processing a read-sum-and-write request from a primary delay line cache to write data to a secondary delay line cache when the address matches the address tag of a secondary cache line.

Referring to FIG. 21, reference numeral 620 generally indicates an exemplary method, in accordance with the invention, for processing a new read-sum-and-write request that matches the address tag of a secondary cache line 267. If the matching secondary cache line 267 has no transport request pending (see decision operation 622), then data is immediately transferred from the primary delay line cache 264 and summed with the data in the secondary cache line 267 as shown at operation 626. Then the secondary delay line cache 266 may issue a new transport request in operation 630 and waits for the transport bus to respond as shown in operation 634. If, however, the matching secondary cache line 267 has a pending transport read request initiated by a primary cache read request (see decision operation 624), the new request is processed as rejected according to the method 440. Note that in one embodiment the decision operation 624 compares with the primary cache request, and thus will not proceed to rejection if the matching cache line has a pending transport read request initiated by a primary cache read-sum-and-write request. If the matching cache line 267 has a pending transport write request and data transfer to the transport bus is in progress (see decision operation 628), the new request is processed as rejected according to the method 440. Otherwise, data is immediately transferred from the primary delay line cache 264 and summed with the data in the secondary cache line 267 as shown at operation 632. In this case, a transport request was already pending, so the secondary delay line cache 266 simply waits for the transport bus as shown in operation 634 as it had been prior to receiving the new matching request. One should note that, in one embodiment, a primary difference between the method 620 and the method 600 is that in method 620, read-sum-and-write requests may transfer data while a transport read request is pending, provided that the transport read request was initiated by another read-sum-and-write request. Another difference in this exemplary embodiment is that the transferred data is summed into the cache in the method 620 whereas the transferred data overwrites the cache in the method 600. Thus, the method 620 may be used to process new read-sum-and-write requests from the primary delay line cache 264 that match the address tag of a secondary cache line 267.

Thus, by means of incorporating the exemplary methods 420, 440, 460, 600, and 620, the method 400 may be used to manage requests from the primary delay line cache 264 to the secondary delay line cache 266. In one embodiment of the invention when the transport bus 316 is time-multiplexed, in the event of transport write slots arriving at the same time as a write request or read-sum-and-write request to the same secondary cache line 267 in the secondary delay line cache 264, the write slots may be left unfilled and may require the memory transport module 324 to resend the transport write slots via the transport bus 316. As mentioned above, it will be appreciated that the primary/secondary delay line cache arrangement shown in FIG. 8 need not be restricted to a ring configuration of signal processor modules (see FIG. 6) but may apply in any configuration, for example, the signal processing subsystem 200 (see FIG. 5).

Exemplary Read-Sum-and-Write Functionality

Figure 22:
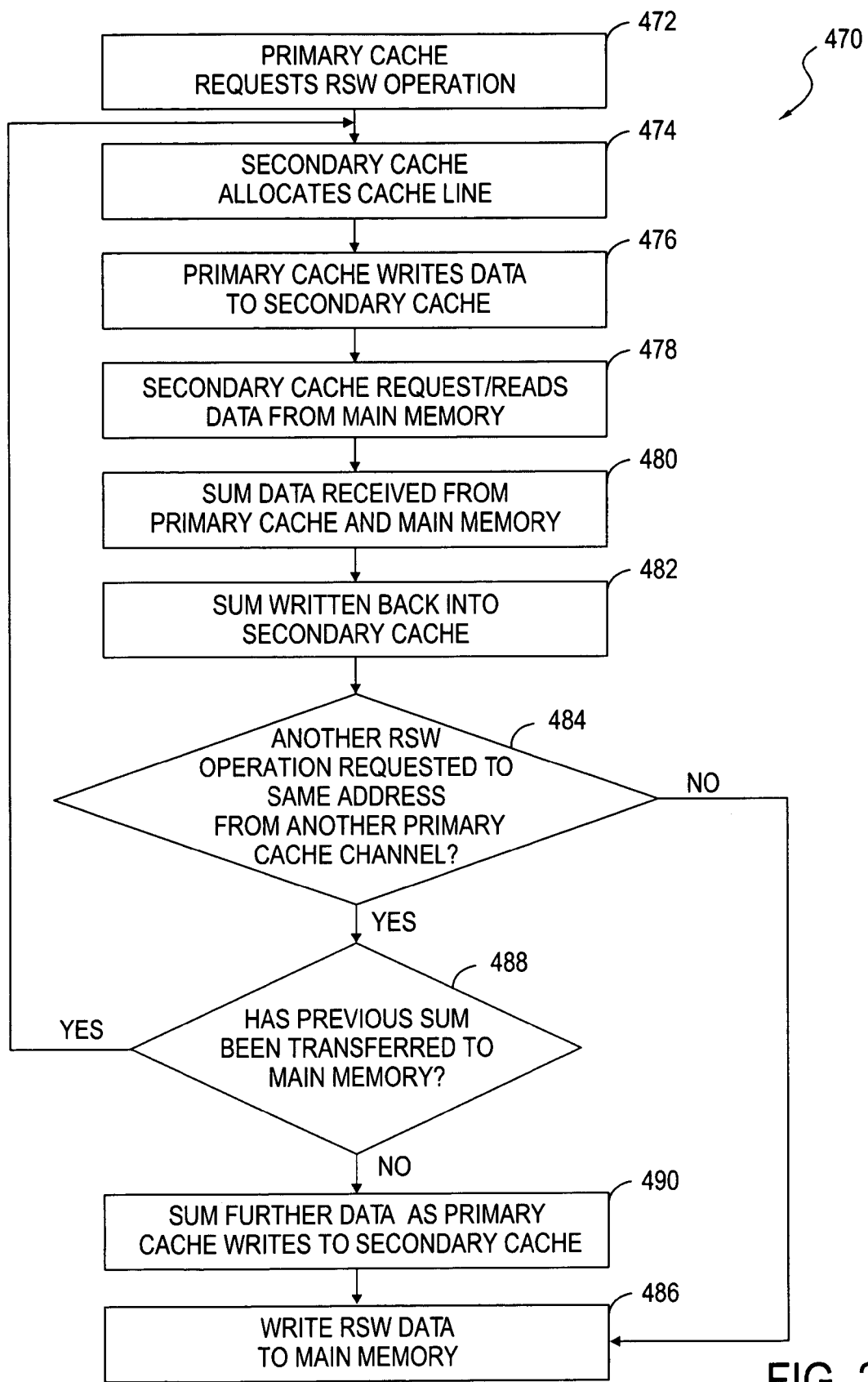
FIG. 22 shows a exemplary flow diagram of a method, in accordance with the invention, of processing a read-sum-and-write request from the primary delay line cache to read, sum and write data to delay lines in the main memory.

Referring to FIG. 22, reference numeral 470 generally indicates a further exemplary method, in accordance with the invention, of performing read-sum-and-write (RSW) operations in secondary cache, for example, the secondary delay line cache 266. As read-sum-and-write operations require both reading from and writing to a memory location in the main delay line memory 341 implementing a delay line, they may require double the bandwidth of a single read or write operation. In one embodiment of the invention, the read-sum-and-write functionality may be performed or executed in the secondary delay line cache 266 and the result thereof transferred to the main delay line memory 341. The operation may be viewed essentially as a write operation in so far as the primary delay line cache 264 is concerned. Thus, for example, in the ring configuration of the subsystem 300 of FIG. 6, data samples may be transferred to the delay module 304 from the DSP module 302, the digital I/O module 312, the sample rate converter module 306, the filter module 308, and the mixer module 310 via the audio bus 318. Upon receipt of the sample data, the delay module 304 may store the data in the primary delay line cache 264 for subsequent communication to an appropriate delay line in the main delay line memory 341. When performing an RSW operation, the data from the main delay line memory 341 must first be read and, thereafter, the data received from the primary delay line cache 264 must be summed with the data read from the main delay line memory 341. Finally the resulting summation is then written back (post-written) to an associated delay line 274 in the main delay line memory 341 (see FIG. 9). As mentioned above, the read-sum-and-write functionality may be performed in the secondary delay line cache 266. Accordingly, multiple read-sum-and-write operations to addresses that are close to each other in the main delay line memory 341 can occur with minimal external bus bandwidth (e.g., of the communication bus 220 (see FIG. 8)). In one embodiment, multiple read-sum-and-write operations to the same addresses can occur without overwrite hazards that may result in lost data. Since each primary cache line 265 is associated with an audio channel, there may be no way for the primary delay line cache 264 to detect multiple read-sum-and-write operations to the same address. Consequently, it may be possible to issue multiple requests to the same address and, depending on the request completion order, the final write-back of one read-sum-and-write request may overwrite that of another, creating an overwrite hazard. An address-associative secondary delay line cache 266 may detect multiple requests to the same address and inhibit such overwrite hazards, thus to provide data coherency between the multiple channels of primary cache.

Returning to the method 470, as shown at operation 472 the method 470 may commence when the primary delay line cache 264 requests an RSW operation. The request from the primary delay line cache 264 may identify the address of the data sample in the main delay line memory 341 to be operated upon (e.g., via the address tags discussed above). Upon receipt of the request from the primary delay line cache 264, the secondary delay line cache 266 may allocate a cache line (see operation 474) and, thereafter, the primary delay line cache 264 may write the sample data to the secondary delay line cache 266 (see operation 476). The secondary delay line cache 266 may then request or read data from the main delay line memory 341 (see operation 478). As mentioned above, in the exemplary subsystem 300 of FIG. 6 the secondary delay line cache 266 may request/read data from the main delay line memory 341 via the transport bus 316 and the memory transport module 324.

Once the secondary delay line cache 266 receives the appropriate data from a corresponding delay line 274 in the main delay line memory 341, it is summed with the data received from the primary delay line cache 264 as shown at operation 480. Thereafter, the sum of the data is written back into the secondary delay line cache 266 (see operation 482). Thereafter, if no further RSW operation has been requested to the same address in the main delay line memory 341 (and thus the same delay line 274) from another primary cache channel (see decision operation 484), then the RSW data in the secondary delay line cache 266 is written (post-written) to the main delay line memory 341 as shown at operation 486. If, however, there is another RSW operation requested to the same delay line address from another primary cache channel then, as shown at decision operation 488, a determination is made whether or not a previous sum has been transferred to the main memory and, if so, the method 470 returns to operation 474. If, however, the previous RSW sample data has not been transferred or communicated to the main memory (e.g., via the transport bus 316 and the memory transport module 324) then the further sample data received from the primary delay line cache 264 may be summed with the previous RSW data and written to the secondary delay line cache (see operation 490). Thereafter, the RSW sample data may be written to the main delay line memory 341 (e.g., via the transport bus 316).

In one embodiment of the invention, if a write data transfer to the main delay line memory 341 (e.g., via the transport bus 316) is partially complete on a read-sum-and-write cache line in the secondary delay line cache 266, any RSW requests from the primary delay line cache 264 to the same address may be rejected. Accordingly, the likelihood of writing any incomplete buffers (implementing delay line caches) to the main delay line memory 341 may be at least reduced. In a boundary case, if transport write slots (for writing data to the main delay line memory 341) of the transport bus 316 arrive at the same time as a RSW request is presented to a secondary cache line 267, the write slots may be left unfilled and the delay module 304 may require the memory transport module 324 to resend the write slots via the transport bus 316. In one embodiment, a final write (post-write) to the main delay line memory 341 implementing the delay lines, may optionally be delayed until all RSW operations have been completed in a particular secondary cache line 267 of the secondary delay line cache 266.

Figure 13:
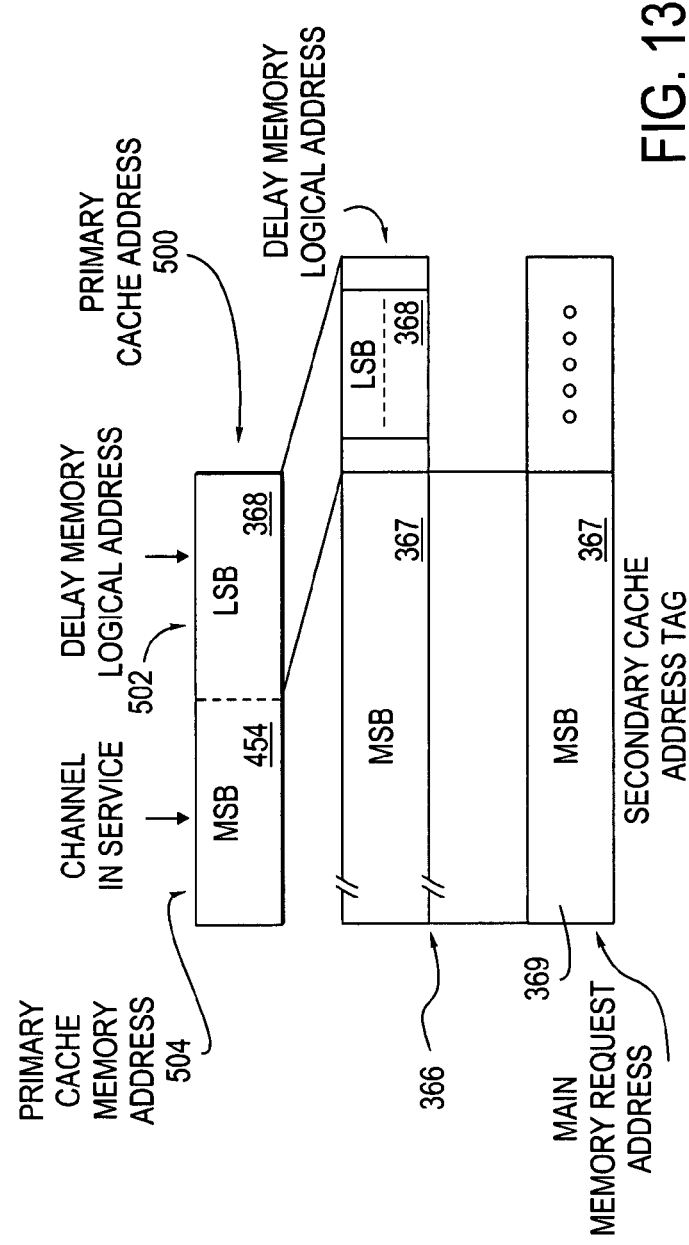
FIG. 13 shows exemplary addressing of delay line caches and main delay line memory implementing the external delay lines.

As mentioned above, each cache line provided in the secondary delay line cache 266 may have an associated address tag, for example, a secondary cache line address tag 367 (see FIG. 13). In certain embodiments, several status and control bits may also be provided (not shown in FIG. 13). In certain embodiments, when primary cache lines 265 in the primary delay line cache 264 correspond to channels (e.g. audio channels on the audio bus 318), the memory within the primary delay line cache 264 (see FIG. 8) may be divided into equal sized regions, one region per channel. In such embodiments, a memory address 500 (see FIG. 13) for accessing individual samples within the primary delay line cache 264 may include a sample address identification field 502 and a channel identification field 504. In one embodiment of the invention, the sample address identification field 502 may be equal to the least significant bits (LSB) 368 of a delay memory logical address 366. In one embodiment, a main memory address 369 may provided by the most significant bits (MSB) of the delay memory logical address 366 and 5 bits of zeroes. The MSB bits may then be used as a secondary cache address tag. When the channels are provided on the audio bus 318 in a time-multiplexed fashion, the channel identification field 504 may indicate a channel in service. When requesting service, the primary delay line cache 264 may present the channel identification field 504 to the secondary delay line cache 266. The secondary delay line cache 266 may use the channel identification field 504 to associate a secondary cache line 267 with a primary cache line 265. Thus, when the secondary delay line cache 266 transfers data to or from the primary delay line cache 264, it may present the channel identification field to indicate the primary delay line cache channel to which the data transfer should be directed. As described in more detail below, in one embodiment of the invention the secondary cache line address tag 367 may include an age field that is used to implement the least recently used allocation scheme (see operation 422 in FIG. 17). For example, each time a cache channel (corresponding to a primary cache line 265) of the primary delay line cache 264 uses a secondary cache line in the secondary delay line cache 266, the age field in the secondary cache line address tag 367 may be reset. The age field may be used when multiple main memory addresses are close to each other such that they point to the same region of the main delay line memory 341 that fits within a particular cache line. In these cases, it may be desirable to delay reallocation of a secondary cache line 267 to increase the possibility of an address tag match, thus improving bus efficiency by reducing redundant requests to the same address. The least recently used allocation scheme may use the age field to select a secondary cache line for allocation, always selecting the oldest secondary cache line, i.e. the one with the greatest age. In certain embodiments, the aging functionality may be disabled for individual delay line accesses if it is not possible for multiple delay line addresses to be close enough to each other so that they fit within a cache line. Thus, for example, if read and write pointers for a delay line in the secondary delay line cache 266 are further apart than a predetermined number of memory locations (e.g., 8DWORDS), and there is no possibility that the pointers will modulate (dynamically change) so they are closer than the predetermined number of memory locations, then an age enable (AE) bit may not be set in a delay line control register (as described in more detail below). If two pointers are closer together, but belong to different logical delay lines, such as at the boundary between two separate delay lines, then the age enable bit need not be set. When the age enable bit is not set, the age may be automatically set to maximum. In this way, the least recently used allocation scheme will prefer allocating secondary cache lines for which the age enable bit is not set, thus increasing the duration a secondary cache line 267 for which the age enable bit is set may remain in the secondary delay cache 266, further increasing the possibility of an address match.

Pointer Distance Restrictions

It will be appreciated that, due to bus latency (e.g., latency of the buses 112, 212, 325 or the like) and thus the size of a secondary cache line 267, certain distance restrictions may arise with respect to the read and write pointers. As discussed above with reference to FIG. 9, a first pointer address of a delay line 274 may be the highest value of the pointer (the highest address location) within any particular delay line 274 and, as the required delay from the delay line 274 increases, the address of the read pointer may decrease (see arrows 278 and 280 in FIG. 9).

As the secondary delay line cache 266 may mirror a subset of the data samples in the delay lines 274 of the main delay line memory 341, in one embodiment, a delay line write address may be greater than any RSW address by at least number of samples in one secondary cache line 267 plus a sample period. For example, the differences between the addresses may, in one embodiment, equal 9 samples in a 32-bit sample mode, or 17 samples in a 16-bit sample mode. In certain circumstances if these exemplary minimum distances are not observed, a possibility may arise that a delay line write operation could complete after a RSW operation that the delay line write should have preceded. In these circumstances, the data written to main delay line memory 341 by the RSW operation via the secondary delay line cache 264 may be overwritten by the write operation, causing the data written by the RSW operation to be lost.

Figure 23:
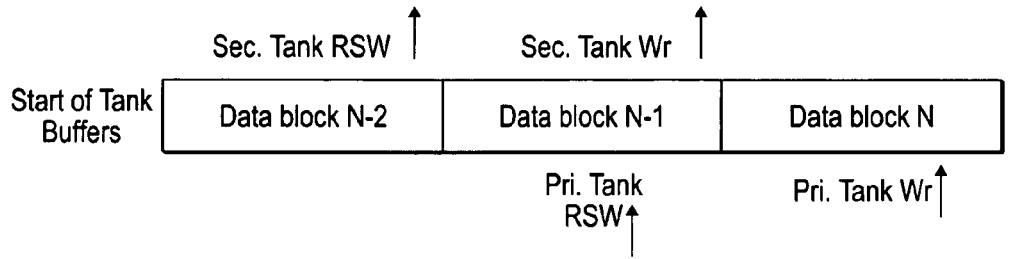
FIG. 23 shows exemplary pointer restrictions between write and read-sum-write pointers at a start of a cache line in the secondary delay line cache.
Figure 24:
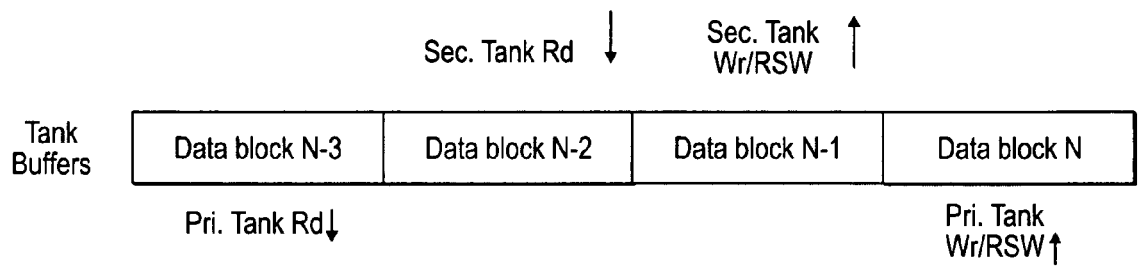
FIG. 24 shows exemplary pointer restrictions between read and write/read-sum-write pointers within a cache line.

Referring to FIG. 23, in one embodiment a delay line write or RSW pointer address in the secondary delay line cache 266 should be greater than any read pointer address in the same secondary cache delay line by, for example, at least 3 secondary cache lines plus a sample period which, in one embodiment, may equal 25 addresses in a 32-bit mode or 49 addresses in a 16-bit mode. Accordingly, secondary delay line cache writes/RSW operations may always write or sum a cache line behind the one currently being sent to the primary delay line cache 264, and secondary delay line read operations may always read a cache line ahead of the one being fetched by the primary delay line cache 264. Thus for the given example, a minimum of 3 complete cache lines of separation may ensure that a delay line write/RSW and read will not collide with the same secondary cache line.

In circumstances where the abovementioned separation is not observed, a possibility may arise that the data written by the delay line write pointer may not be seen by the read pointer, or the data summed in by the RSW pointer may not be seen by the read pointer. Conversely, there may be no problem if a read pointer is placed at any pointer address higher than a RSW pointer as the read pointer may never see the data summed in by the RSW pointer.

In one embodiment, there may be no restriction with respect to adjoining, independent delay line buffers that the read-ahead, as a write-behind strategy may ensure that the secondary cache line addresses passed from the primary delay line cache 264 to the secondary delay line cache 266 may be different from their associated buffers.

Secondary Cache Control Register

Figure 25:
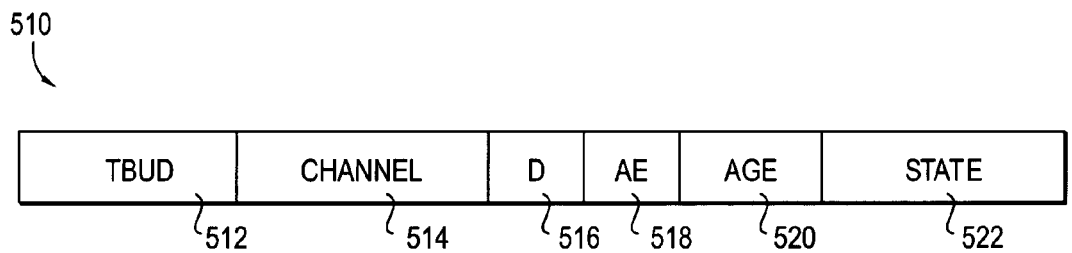
FIG. 25 shows an exemplary secondary cache control register.

As mentioned above, a delay line cache controller (e.g., the delay line cache controller 206) may be provided. In one embodiment of the invention, the delay line cache controller 206 may have a secondary cache control register 510 (see FIG. 25) including the following exemplary data fields:

Time budget (TBUD [3:0]) 512—the time budget may specify a number of sample periods a delay line channel can tolerate before running out of primary delay line cache locations in the primary delay line cache 264. For example, the time budget may occupy 4 bits of the secondary cache control register 510.

Primary delay line cache channel (CHAN [9:0]) 514—this data may identify a channel (e.g., an audio channel) that generated a request associated with data in the primary cache line 265. For example, this data may occupy 10 bits of the secondary cache control register 510.

Dropped (D) 516—this data may indicate that a pending transport request has been dropped and should be re-issued after a re-issue timer has expired.

Age enable (AE) 518—age enable bits may enable the aging of data in a DATA_VALID state (see below). In one embodiment, an age enable bit in the secondary cache control register 510 may be set at zero to indicate that the age should be set at a maximum as soon as the last data transfer has occurred, permitting the cache line to be reused.

Age of data (AGE [3:0]) 520—in one embodiment, if a state is DATA_VALID (see below) the age data may indicate the time since last used by the primary delay line cache 264. The age data may be reset each time a cache hit is detected. In one embodiment, if the D (dropped) bit is set, the age data may be used as a re-issue timer which may prevent the cache from issuing a transport request until the re-issue timer decrements to 0.

State (STATE [5:0]) 522—this data may identify a state of a secondary cache line in the secondary delay line cache 266.

Exemplary states of a secondary cache line 267 may include:

```
DATA_INVALID
READ16_INSERTED
READ16_PENDING
READ16_DATA_READY
WRITE16_INSERTED
WRITE16_ACK_DONE
WRITE16_PENDING
WRITE16_TRANSFERRING
READ32_INSERTED
READ32_PENDING
READ32_DATA_READY
WRITE32_INSERTED
WRITE32_ACK_DONE
WRITE32_PENDING
WRITE32_TRANSFERRING
DATA_VALID
RSW16_INSERTED
RSW16_WR_ACK_DONE
RSW16_READ_PENDING
RSW16_SUMMING
RSW16_SUMMING_RP
RSW16_WRITE_INSERTED
RSW16_WRITE_PENDING
RSW16_SUMMING_WP
RSW16_WRITE_TRANSFERRING
RSW32_INSERTED
RSW32_WR_ACK_DONE
RSW32_READ_PENDING
RSW32_SUMMING
RSW16_SUMMING_RP
RSW32_WRITE_INSERTED
RSW32_WRITE_PENDING
RSW32_SUMMING_WP
RSW32_WRITE_TRANSFERRING and so on.
```

The age of data field (AGE) 520 maybe treated differently dependent upon the state of a secondary cache line. For example, if the cache line is in the DATA_VALID status, it may be incremented and represent a time since last usage of the secondary cache line by the primary delay line cache 264. In one embodiment, if the age of data field 520 is in any _INSERTED state, it maybe decremented. In any _INSERTED state, the age field 520 may be treated as a re-issue timer and prevent transport bus requests from being issued until it has decremented to zero.

In one embodiment, DATA_VALID cache lines may be aged. For example, to support a least-recently-used algorithm for selecting cache line locations (see operation 422 in FIG. 17) secondary cache lines may be aged. In one embodiment, the age of data field 520 of the secondary cache control register 510 may be incremented 8 times per sample period (e.g., every 512 clocks) for read or write requests, and 4 times per sample period (e.g., every 1024 clocks) for read-sum-and-write requests as RSW requests may age more slowly. A secondary cache line allocation algorithm or process may choose an idle secondary cache line with the greatest value in the age field 520, except that cache lines flagged as data invalid may be chosen first. In one embodiment, a bit is appended to the MSB of the age of data field 520 and a 5-bit comparison is performed to perform this test. This may have the effect of making invalid secondary cache lines appear older than valid cache lines and, accordingly, they may be allocated first. In one embodiment, the age of data field 520 may be reset every time a secondary cache hit is detected.

As mentioned above, the age of data field 520 may be used to indicate or trigger a re-issue of a dropped transport request. In one exemplary embodiment, the re-issue timer may be decremented every 32 clocks (e.g., 128 times per sample period) regardless of the type of request as long as the dropped bit is set in the secondary cache control register 510. In order to prevent wrap around, the age of data field 520 may saturate at a minimum value of 0. In one embodiment, when the re-issue timer decrements to zero, a transport request may then be re-issued and the dropped bit may be reset. In order to reduce start-up delay, the bit in the Dropped (D) field 516 and the age of data field 520 may be set to zero when a request is initially inserted from the primary delay line cache 264. In one embodiment, the age data field 520 is set to non-zero in the _INSERTED state in response to a dropped request notification.

It will however be appreciated by a person skilled in the art that any one or more of the above methods may be implemented by a state machine, the specific details of which may vary from embodiment to embodiment. Further, it will be appreciated that the above states are merely exemplary states and that further states may be added or states may be removed in other embodiments.

Exemplary Secondary Delay Line Cache Address Register

The delay line cache controller 206 may also include a secondary cache address register that includes address information of each secondary cache line in the secondary delay line cache 266. The secondary cache address register may include a logical byte address of data in each secondary cache line that may, for example, comprise 32 bytes. In one embodiment of the invention, the secondary cache address register may serve as a secondary cache line address tag 367 (see FIG. 13) used to detect matching requests as in the method 400 (see FIG. 16). In one embodiment of the invention, when the transport burst size is 8 DWORDS and each burst is aligned on an eight double word (DWORD) boundary, bits 5 to 24 may define the logical byte address of the data in the cache line and bits 0 to 4 may be zero. In this context, the term "DWORD" refers to 32-bit words, comprised of four 8-bit bytes. An eight DWORD quantity of data corresponds to thirty-two bytes. Since thirty-two bytes may be addressed with five bits, the five LSB bits 0 to 4 may be assumed to be zero for the start logical byte address within the main delay line memory 341 of the data within a secondary cache line 267.

In one embodiment of the invention, secondary cache data is defined by 32 bits that correspond with 32-bit data in each secondary cache line. Each secondary cache line may thus, in one embodiment comprise eight DWORDS.

Exemplary Primary to Secondary Cache Bus Interface

As mentioned above, the primary delay line cache 264 may communicate via the communication bus 268 with the secondary delay line cache 266 (see FIG. 8). Further, in one exemplary embodiment, the primary delay line cache 264 is arranged per channel and the secondary delay line cache 266 is arranged per address of a corresponding delay line in the main delay line memory 341. The primary delay line cache 264 may communicate with the secondary delay line cache 266 using a split request/acknowledge protocol. A channel number and a command code may accompany the request. An acknowledge signal from one of the primary or secondary delay line caches 264, 266 may return a channel number and a status code. In one embodiment, a request and acknowledge for a single channel need not overlap and may be separated in time by several sample periods. However, in other embodiments of the invention, a simultaneous request and acknowledge from different channels may take place.

In one exemplary embodiment of the invention, six request command codes are provided, namely, READ16, WRITE16, RSW16, READ32, WRITE32, and RSW32. The secondary delay line cache 266 may require knowledge of the bit width of the logical word in order to, for example, support big-endian/little-endian modes. In addition, in one embodiment, the secondary delay line cache 266 may perform the RSW operations and, accordingly, the secondary delay line cache 266 may split an adder (performing the summing) for 16 bit wide data.

In one embodiment, three status codes may be provided, for example, READ_XFER, WRITE_XFER, and REQ_REJECT. The data may be transferred 32-bits per clock and, accordingly, there may not be a need to identify the bit-width of the request during an acknowledge cycle. When the actual data transfer to/from the primary delay line cache 264 is complete, the primary delay line cache 264 may reset the RP bit 372 (see FIG. 12) in the primary cache control register 350. The secondary delay line cache 266 may signal a REQ_REJECT status code if the secondary delay line cache 266 is full. The primary delay line cache 264 may react to this by setting the request rejected (RR) bit 374 (see FIG. 12) in the primary cache control register 350. Both the READ_XFER and WRITE_XFER status codes may be held active for several clock cycles. Read transfer may begin when the acknowledge cycle begins and continue until the acknowledge cycle ends.

In one embodiment of the invention, a write data transfer may begin a number of clock cycles (e.g. three clock cycles) after an acknowledge cycle begins and continue until a number of cycles (e.g. three clock cycles) after the acknowledge cycle ends. For example, no wait states may be permitted in either direction. A READ_XFER may indicate data flow from the secondary delay line cache 266 to the primary delay line cache 264. A WRITE_XFER may indicate data flow from the primary delay line cache 264 to the secondary delay line cache 266. The request may be complete as soon as a READ_XFER or a WRITE_XFER is complete.

In one embodiment of the invention, the secondary delay line cache bus interface may not tolerate wait states during a data transfer and, accordingly, primary delay line cache RAM may need to provide more bandwidth than can be provided by a single-port RAM. In one embodiment, a full dual-port RAM may be used. However, in another embodiment of the invention, an interleaving scheme may be used. Accordingly, secondary delay line cache transfers to/from the primary delay line cache 264 may begin on an even address. The delay module 304 may then provide accesses to the primary delay line cache 264 in specific time-slots relative to the audio ring channel identifier. A delay module access start address may be either even or odd, however, so an additional level of data buffering allows for a single clock cycle delay in RAM access to avoid a collision. Accordingly, as described above by way of example, write transfers may have a three-clock delay instead of a two-clock delay as may ordinarily be required.

Secondary Cache Transport Bus Queuing

In one embodiment of the invention, secondary cache RAM may be a full dual-port RAM to provide the bandwidth required for RSW operations from the transport bus 316. Additional bandwidth may be needed to accommodate a simultaneous primary delay line cache data transfer, which can occur if a primary delay line cache data transfer is in progress when transport bus read data arrives from a RSW request. Accordingly, in these circumstances, a transport bus first-queued protocol may be used to store and read data on the transport bus 316. The secondary delay line cache 266 may complete the in progress primary delay line cache data transfer and wait for the first-queued data to return on the transport bus 316. While waiting, in one embodiment, the secondary delay line cache 266 may not acknowledge any more primary delay line cache requests with data transfer status so that queued data will not remain on the transport bus 316 for more than a single round trip on the ring arrangement. In another embodiment of the invention, the secondary cache RAM may be a quad-port RAM, which allows the primary delay line cache requests to complete concurrently with RSW operations from the transport bus 316. If the implementation of the read-sum-write addition logic requires a pipeline delay N from the reading of cache data to the writing of summed cache data, a small FIFO of depth N+1 is required on the input of data from the primary cache to the secondary cache to hold back the primary cache data summation temporarily if it is detected that the transport bus has already commenced summing into the same cache location that the primary cache is about to sum into. Similarly, a FIFO of depth N may be required on the transport side if it is detected that the primary cache has already commenced summing into the same cache location that the transport bus is about to sum into. One FIFO must be of a depth of one greater than the other FIFO to resolve the hazard of a simultaneous read of the same location from both the transport and the primary cache. To ensure that all such collision hazards are always resolved within the depth of the said fifos, the addressing order of the primary cache data burst can be reversed relative to the transport data burst. In other words, if the transport bus data burst order is from address K to address K+7, the primary cache data burst order is from address K+7 down to address K. This may ensure that at most only one address can overlap during concurrent bursts.

Secondary Cache Request Priority Queue

Figure 26:
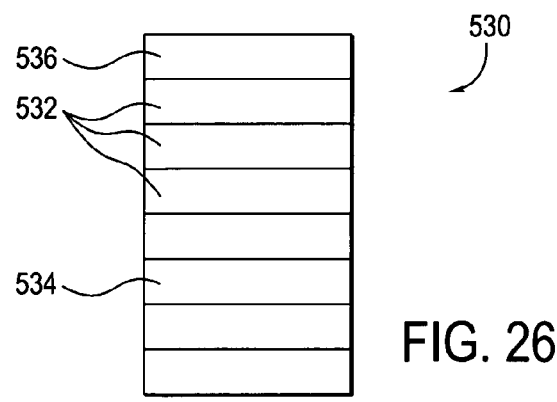
FIG. 26 shows an exemplary secondary cache request priority queue.

Referring to the method 440 (see FIG. 18), in one embodiment of the invention, an exemplary secondary cache request priority queue 530 (see FIG. 26) stores the highest priority requests received from the primary delay line cache 264 that were unable to be inserted into the secondary delay line cache 266, for example, because the secondary delay line cache 266 was full.

In one embodiment, the priority queue 530 may include eight levels 532 and the priority of a request received from the primary delay line cache 266 may be determined by examining a time budget parameter, for example, a time budget provided in the time budget field 512 as described above with reference to the secondary cache control register 510. For example, smaller time budgets may have a higher priority and, rather than immediately rejecting a primary delay line cache request when the secondary delay line cache 266 is full, the primary delay line cache request may be inserted into the priority queue 530. If a request received from the primary delay line cache 264 had an address matching a currently allocated secondary cache line address, but could not be processed at the time it was received because, for example, there was a pending transport read into the cache line, that request may be marked as a "recent hit" request, and may have higher priority than a "non-hit" request having the same time budget, unless the "non-hit" request is "urgent," e.g., having a time budget of 2 or less. In one embodiment, the reason for giving "recent hit"

requests higher priority is that they will not require a transport bus transaction, and thus can be dispatched quickly, if the request is still a cache hit when it is presented to the secondary cache the next time. The likelihood of a "recent hit" request still being a cache hit when presented a second time decreases as the request ages. If the secondary delay line cache request priority queue 530 is not full, the request from the primary delay line cache 264 may be inserted in order of priority in the priority queue 530. However, if the request priority queue 530 is full, the priority of the request from the primary delay line cache 264 may be compared with the priority of all requests in the priority queue 530. If the priority of the request received from the primary delay line cache 264 is lower than the priority of any requests in the priority queue 530, thereby indicating the current primary request has a higher priority, the request may be inserted into the priority queue 530. In these circumstances, the priority request with a lowest priority (e.g., at a level 534) may then be dropped from the priority queue and stored e.g. in a first-in-first-out (FIFO) buffer. The "recent hit" status of a request may not be saved in the FIFO buffer. When the FIFO buffer is full, a reject notice may be sent back to the primary delay line cache 264 so that the transaction or operation may be performed again at a later stage (e.g., a further request may be communicated from the primary delay line cache 264 to the secondary delay line cache 266). When a secondary cache line of the secondary delay line cache 266 becomes available, a request in the priority queue 530 having the highest priority (e.g., at level 536) may be inserted into the secondary delay line cache 266.

In embodiments of the invention containing a reject FIFO, a fairness flag may permit alternating between the priority queue 530 and the reject FIFO for selection of requests to insert into the secondary delay line cache 266, during times when no requests from the primary cache are being received. The fairness flag may be toggled during each available insertion period when there is no primary cache request. Thus, when the fairness flag is in one state, requests may be inserted from the priority queue 530, and when it is in the other state, requests may be inserted from the reject FIFO. This may provide more opportunities for cache address tag matches, and may expose requests within the reject FIFO for which the time budget has decreased and thus may have become high priority requests. The time budget of a request in the FIFO can be maintained by inserting a time stamp with the request and its time budget when it is inserted into the FIFO, where the time stamp is read from a sample counter. When a request is read from the FIFO, its time budget may be updated by taking the difference of the current value of the sample counter from the time stamp saved in the FIFO, and then deducting this value from the time budget read from the FIFO with the request to compute the updated value of the time budget for the request.

The time budget may thus provide an indication of the length of a particular bus transaction latency required, and be in the form of a time budget parameter. The time budget parameter of a primary delay line cache request may also be used to prioritize the requests in the secondary cache request priority queue 530 and accordingly, in one embodiment, ultimately in a transport module priority queue. In one embodiment, the transport bus time budget parameter may be encoded as a floating-point value and the secondary delay line cache may translate the time budget value prior to placing it on the transport bus 316.

Although the subsystems 200, 300 are described, by way of example, with reference to the processing of digital audio signals, it will be appreciated that the subsystems 200, 300 may be used to process any digital signals including video and other multi-media signals. Unlike conventional digital processing devices, the subsystems 300 in accordance to the invention allows each module 302 to 312 to communicate data with any other module 302 to 312 connected to the data path 314. In one embodiment of the invention, the data path 314 is time-division multiplexed wherein a routing controller controls communication of data between the various modules 302 to 312. Further, it is to be appreciated, that the modules 302 to 312 are merely exemplary modules and further modules (with the same or differing processing capabilities) may be included in the subsystem 300 and/or any one or more of the modules 302 to 312 may be removed and, for example, included within any other module 302 to 312.

Thus, in one embodiment, any one of the modules 302, 306 to 312 may communicate data to the delay module 304. Accordingly, data being processed by the digital processing subsystem 300 may be flexibly routed to the delay module 304. It will be appreciated that a module 302 to 312 may also communicate data back to itself via the audio bus 318. Accordingly, repeated processing may be performed on the data by the same processing module.

The audio memory transport module 324 communicates via the data bus 321 with the interface module 322 that, for example, communicates with a bus 325 of the host computer device (for example a personal computer or PC). In one embodiment, the interface module 322 includes a bridge 330 and two PCI-X bus interfaces 332 that interface the bridge 330 to the conventional PC bus 325 (which may correspond to the bus 112 of FIG. 1). The digital I/O module 312 may receive a digital audio input and provide digital audio output to an output device. As the various modules are located along the audio bus 318, audio data may be routed between modules without requiring the data to be routed through a central hub (e.g., a DSP).

In one embodiment, each delay line of the delay line memory portion may be accessed with individual read and write operations that are separate from those of other delay lines. Accordingly, the memory circuit memory 208 may be directly coupled to a digital signal processor that executes the DSP algorithm. The direct coupling of these circuit elements allows the processor to access the local memory with relatively low latency, on-demand (e.g., as needed by the processor), and on a sample-by-sample basis. However, as the requirement for local or circuit memory increases in size, it may become less cost effective to use local memory to implement all the delay lines. Accordingly, delay lines can also be allocated to the main memory via the delay line cache.

Thus, a method, circuit and system to process digital delays have been described. Although the invention is described with reference to processing a digital media stream in the form of a digital audio stream, it is however to be appreciated that the invention may be applied to the processing of any other digital media streams, for example, digital video streams or the like. Further, although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A delay line circuit to delay digital data in a main memory, the delay line circuit comprising:
   primary delay line cache to receive digital data to be delayed from a signal processor module;
   secondary delay line cache connected to the primary delay line cache and operatively connected to the main memory to send data to and receive delayed data from the main memory; and
   a cache controller to control communication of data between the secondary delay cache and the primary delay cache, wherein data in the secondary delay line cache is updated with data from the main memory dependent upon a number of unread data samples in the primary delay line cache.

2. The delay line circuit of claim 1, wherein the data in the primary delay line cache is arranged in at least two data blocks, and data in one block is updated with data from one of the processor module and the secondary delay line cache after all data in the block has been transferred.

3. The delay line circuit of claim 2, wherein the secondary delay line cache is updated with a block of data from the main memory corresponding to the block that has been read, and then the block of data is transferred from the secondary delay line cache to the primary delay line cache.

4. The delay line circuit of claim 2, wherein the primary delay line cache comprises data blocks and a memory address of the primary delay line cache defines a trigger signal to trigger a data update from one of the secondary delay line cache and the signal processor module.

5. The delay line circuit of claim 4, wherein data is communicated between the main memory and the secondary delay line cache dependent upon the status of the trigger signal.

6. The delay line circuit of claim 4, wherein data is communicated between the secondary delay line cache and the primary delay line cache dependent upon the status of the trigger signal.

7. The delay line circuit of claim 4, wherein the trigger signal is activated by a binary bit of the address that is "0" when a first block of data is read and "1" when a second block of data is read.

8. The delay line circuit of claim 1, wherein data in the secondary delay line cache is a duplicate of a subset of data in the main memory.

9. The delay line circuit of claim 1, which is integrated in the same integrated circuit defining the signal processor module.

10. The delay line circuit of claim 1, wherein the secondary delay line cache receives post-written data from the main memory, adds current data received from the primary delay cache to the post-written data, and stores the sum in the secondary delay line cache for communication to the main memory thereby to perform a read-sum-and-write operation on a delay line.

11. The delay line circuit of claim 1, wherein the cache controller comprises a cache control register and data is communicated between the primary and secondary delay line caches dependent upon the status of data in the cache control register.

12. The delay line circuit of claim 11, wherein the cache control register comprises a request pending field to indicate when a request is pending to transfer data between the primary delay line cache and the secondary delay line cache.

13. The delay line circuit of claim 11, wherein the cache control register comprises a request reject field to indicate when a request to transfer data between the primary delay line cache and the secondary delay line cache has been rejected.

14. The delay line circuit of claim 1, which comprises a secondary cache request priority queue for queuing primary cache requests.

15. The delay line circuit of claim 14, wherein requests from the primary delay line cache are prioritized and a queued request with a lowest priority is replaced in the priority queue by a current request with a higher priority.

16. The delay line circuit of claim 15, wherein the priority of a request is determined by a time budget that indicates a time for completion of the request and a lower time budget indicates a higher priority, and wherein a queued request in the priority queue with a highest time budget is removed and a current request with a lower time budget is inserted.

17. The delay line circuit of claim 1, wherein the primary delay line cache comprises a plurality of primary cache lines each of which correspond to a digital data channel, and the secondary delay line cache comprises a plurality of secondary cache lines corresponding to memory locations in the main memory.

18. The delay line circuit of claim 1, which forms part of a delay module that receives digital audio samples to be delayed.

19. The delay line circuit of claim 18, wherein the delay module comprises delay line memory to implement a plurality of digital delay lines, and a delay line cache including the primary delay line cache and the secondary delay line cache.

20. A method of implementing delay lines in a main memory via delay line cache, the method comprising:
   communicating data to a primary delay line cache associated with a delay line in main memory;
   selectively communicating data between the primary delay line cache and a secondary delay line cache;
   selectively communicating data between the secondary delay line cache and the main memory;
   updating the primary delay line cache with digital data from the main memory via the secondary delay line cache; and
   communicating data from the primary delay line cache associated with the delay line in the main memory, wherein data in the secondary delay line cache is updated with data from the main memory dependent upon a number of unread data samples in the primary delay line cache.

21. The method of claim 20, which comprises arranging the data in the primary delay line cache in at least two data blocks, and updating data in one block with data from one of the secondary delay line cache and a signal processor module after all data in the block has been transferred.

22. The method of claim 21, which comprises updating the secondary delay cache with a block of data from the main memory corresponding to the block that has been read, and thereafter transferring the block of data from the secondary delay line cache to the primary delay line cache.

23. The method of claim 21, wherein the primary delay line cache comprises data blocks and a memory address of the primary delay line cache defines a trigger signal to trigger a data update from one of the secondary cache line and the signal processor module.

24. The method of claim 23, which comprises communicating data between the main memory and the secondary delay line cache dependent upon the status of the trigger signal.

25. The method of claim 23, which comprises communicating data between the secondary delay line cache and the primary delay line cache dependent upon the status of the trigger signal.

26. The method of claim 20, which comprises;
communicating post-written data between the secondary delay line cache and the main memory;
adding current data received from the primary delay cache to the post-written data; and
storing the sum in the secondary delay line cache for communication to the main memory thereby to perform a read-sum-and-write operation on a delay line.

27. The method of claim 20, which comprises communicating data between the primary and secondary delay line caches dependent upon the status of data in a cache control register.

28. The method of claim 27, which comprises monitoring a request pending field of the cache control register to identify when a request is pending to transfer data between the primary and secondary delay line caches.

29. The method of claim 27, which comprises monitoring a request reject field of the cache control register to identify when a request to transfer data between the primary and secondary delay line caches has been rejected.

30. The method of claim 20, which comprises queuing primary cache requests.

31. The method of claim 30, which comprises prioritizing requests from the primary delay line cache and replacing a queued request with a lowest priority with a current request with a higher priority.

32. The method of claim 31, which comprises removing a queued request in the priority queue with a highest time budget and inserting a current request with a lower time budget, the time budget indicating a time for completion of the request.

33. A machine-readable medium comprising a set of instructions that, when executed by a machine, cause the machine to:
communicate data to a primary delay line cache associated with a delay line in main memory;
selectively communicate data between the primary delay line cache and a secondary delay line cache;
selectively communicate data between the secondary delay line cache and the main memory; and
update the primary delay line cache with digital data from the main memory via the secondary delay line cache; and
communicate data from the primary delay line cache associated with the delay line in main memory, wherein data in the secondary delay line cache is updated with data from the main memory dependent upon a number of unread data samples in the primary delay line cache.

34. The machine-readable medium of claim 33, wherein the data in the primary delay line cache is arranged in at least two data blocks, and data in a block is updated with data from one of the secondary delay line cache and a signal processor module after all data in a block has been transferred.

35. The machine-readable medium of claim 34, wherein the secondary delay cache is updated with a block of data from the main memory corresponding to the block that has been read, and then the block of data is transferred from the secondary delay line cache to the primary delay line cache.

36. A delay line circuit to delay digital data in a main memory, the delay line circuit comprising:
means for communicating data to a primary delay line cache associated with a delay line in the main memory;
means for selectively communicating data between the primary delay line cache and a secondary delay line cache;
means for selectively communicating data between the secondary delay line cache and the main memory;
means for updating a primary delay line cache with digital data from the main memory via the secondary delay line cache; and
means for communicating data from the primary delay line cache associated with the delay line in the main memory, wherein data in the secondary delay line cache is updated with data from the main memory dependent upon a number of unread data samples in the primary delay line cache.

* * * * *